(12) United States Patent
Kimura et al.

(10) Patent No.: US 7,211,617 B2
(45) Date of Patent: May 1, 2007

(54) MOLDING MATERIAL AND MOLDING PRODUCT, MANUFACTURING METHOD THEREOF, AND RECYCLING METHOD OF WASTE TONER

(75) Inventors: Satoshi Kimura, Nabari (JP); Yasuhiro Iida, Kashiba (JP); Toshiyuki Kikutani, Sakurai (JP); Kazumi Nakayama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 143 days.

(21) Appl. No.: 10/460,993

(22) Filed: Jun. 13, 2003

(65) Prior Publication Data
US 2004/0005508 A1 Jan. 8, 2004

(30) Foreign Application Priority Data
Jun. 27, 2002 (JP) .............................. 2002-188532

(51) Int. Cl.
*C08F 283/08* (2006.01)
(52) U.S. Cl. .................................... 524/508; 525/92 D
(58) Field of Classification Search ................ 524/508; 525/92 D
See application file for complete search history.

(56) References Cited

U.S. PATENT DOCUMENTS

| 5,262,231 | A | * | 11/1993 | Aoki | ........................ 428/323 |
| 5,689,774 | A | * | 11/1997 | Shishido et al. | ............ 399/111 |
| 2002/0031657 | A1 | | 3/2002 | Kimura et al. | ........... 428/306.6 |

FOREIGN PATENT DOCUMENTS

| EP | 0906817 | 4/1999 |
| JP | 5-317831 | 12/1993 |
| JP | 2001-179740 | 7/2001 |
| JP | 2001-205748 | 7/2001 |

* cited by examiner

*Primary Examiner*—Peter D. Mulcahy
(74) *Attorney, Agent, or Firm*—Edwards Angell Palmer & Dodge LLP; David G. Conlin; Lisa Swiszcz Hazzard

(57) ABSTRACT

Waste toner is fused and kneaded with modified polyphenylene ether so as to be used as a molding material. The waste toner preferably includes a toner ingredient including styrene-acrylic resins. With this arrangement, it is possible to inexpensively manufacture a molding product which has excellent physical properties such as tensile strength, flexural rigidity, and flexural strength and is usable for various purposes.

8 Claims, 12 Drawing Sheets

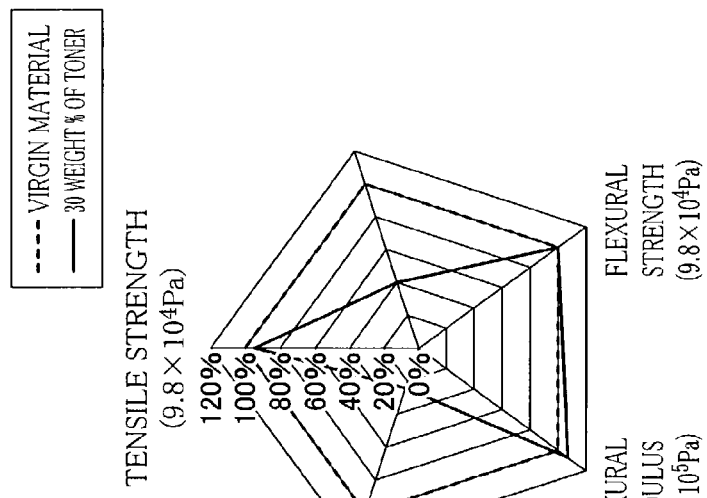
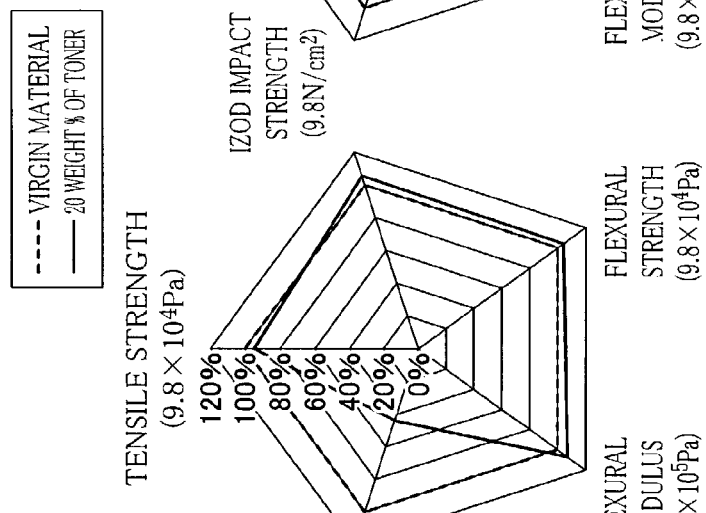
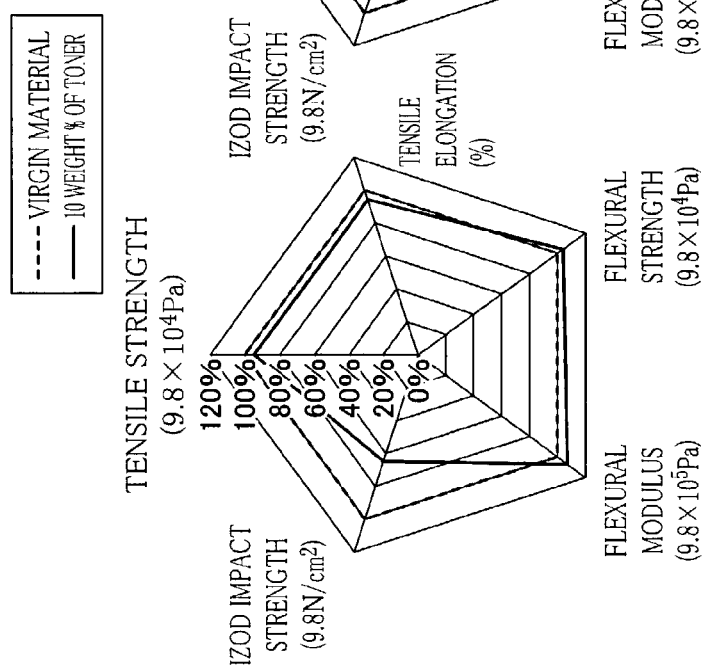

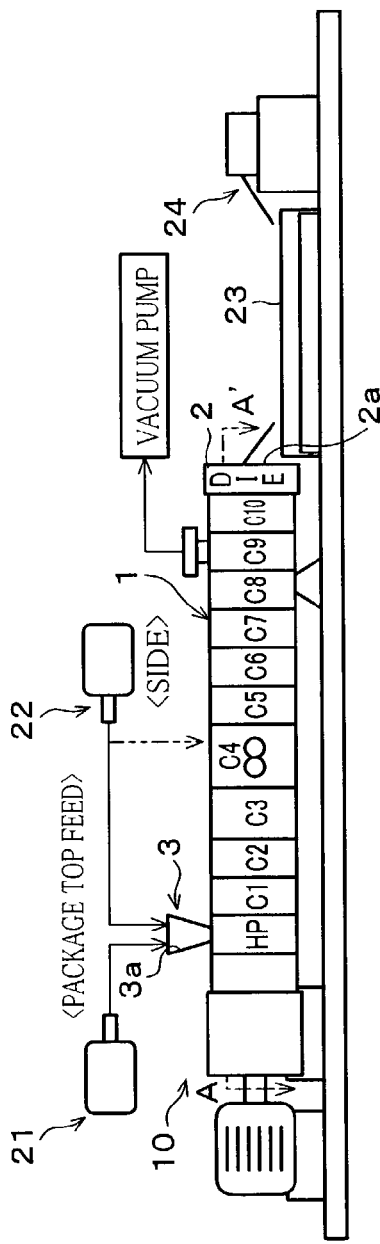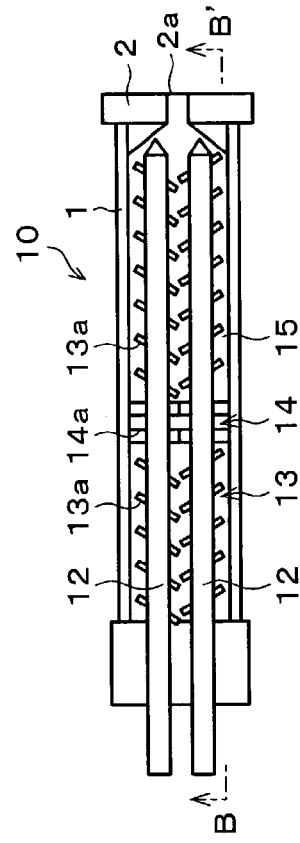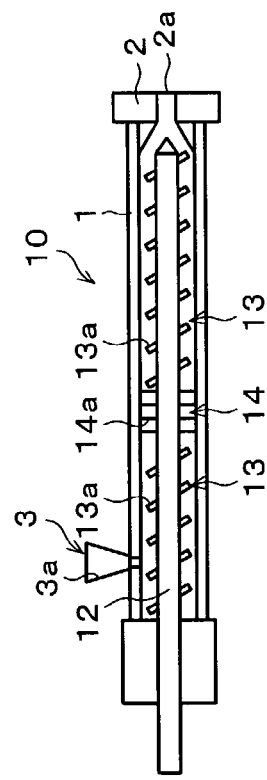
FIG. 5 (a)
FIG. 5 (b)
FIG. 5 (c)

DIRECTION OF THICKNESS

MOLDING MATERIAL AND MOLDING PRODUCT, MANUFACTURING METHOD THEREOF, AND RECYCLING METHOD OF WASTE TONER

FIELD OF THE INVENTION

The present invention relates to a molding material and molding product made of waste toner which can no longer be used as proper toner, a manufacturing method of the molding material and molding product, and a recycling method of waste toner.

BACKGROUND OF THE INVENTION

In the steps of manufacturing toner for image forming devices such as electrophotographic devices, waste toner (fine particles) which has substandard particle size and hence cannot be shipped as products is spun off during an eventual classification step. Even though a part of the waste toner has been recycled by being added to proper toner in the manufacturing step, there is a certain limit to the amount of the waste toner to be recycled, and the residual waste toner has mostly been treated as industrial waste.

However, since it is costly to treat waste toner as industrial waste, there has been demand for a method to effectively recycle waste toner.

As an example of such a method to recycle waste toner, Japanese Laid-Open Patent Application No. 5-317831/1992 (Tokukaihei 5-317831; published on May 15, 1992) discloses that particles of industrial waste are converted to an aggregate and into this aggregate waste toner chiefly made of thermoplastic resin is mixed as a bonding agent, thereby thermo-forming the aggregate.

As another example, Japanese Laid-Open Patent Application No. 2001-179740 (Tokukai 2001-179740; published on Jul. 3, 2001) discloses a method to obtain a molding product by fusing and kneading a used toner cartridge in which toner remains, and then molding the fused and kneaded cartridge.

As a further example, Japanese Laid-Open Patent Application No. 2001-205748 (Tokukai 2001-205748; published on Jul. 31, 2001) discloses a method for manufacturing a molding product in which waste toner as a core layer is covered with a surface skin by means of a sandwich construction method.

However, since the method of Japanese Laid-Open Patent Application No. 5-317831 utilizes waste toner as a bonding agent for an aggregate made of particles of industrial waste, certain limitations are set on (i) the application of the molding product due to the reasons such as its physical properties, (ii) the amount of the waste toner to be used, and (iii) the rate of recycling the waste toner, therefore it is not possible to effectively recycle the waste toner. Meanwhile, the method of Japanese Laid-Open Patent Application No. 2001-179740 is a method for recycling toner cartridges, rather than a method to effectively recycle waste toner which cannot be shipped as products due to substandard particle size, etc.

Moreover, neither one of the molding products obtained by the methods of Japanese Laid-Open Patent Applications No. 5-317831, No. 2001-179740, and No. 2001-205748 has sufficient physical properties such as flexural rigidity, flexural strength, and tensile strength, and thus these molding products have only limited uses.

SUMMARY OF THE INVENTION

The objective of the present invention is to provide (i) a molding material and molding product using waste toner and a manufacturing method of the molding product, for effectively recycling waste toner, and (ii) a method of recycling waste toner, for effectively recycling waste toner.

To achieve the foregoing objective, the molding material of the present invention is characterized by including: modified polyphenylene ether; and waste toner.

In this manner, the waste toner is fused and kneaded with the modified polyphenylene ether and then molded as the molding material, so that the waste toner which cannot be shipped as products is effectively recycled.

The waste toner preferably includes a toner ingredient including styrene-acrylic resin. The toner ingredient is mainly made of binder resin, and resin typically used as this binder resin, e.g. styrene-acrylic resin, is compatible with modified polyphenylene ether. For this reason, using these substances simultaneously does not cause degradation of the physical properties, such as tensile strength, flexural rigidity, and flexural strength, of a molding product to be obtained. Thus, the waste toner can be adopted as a filler for a molding material including modified polyphenylene ether, and hence, using waste toner which cannot be shipped as products, it is possible to inexpensively manufacture a molding product which has excellent physical properties such as tensile strength, flexural rigidity, and flexural strength and is usable for various purposes.

Further, since the molding material includes the waste toner, the fluidity of the molding material improves, and hence the moldability of this molding material is better than a molding material not including waste toner.

Moreover, since waste toner includes a colorant even if the waste toner cannot be shipped as products, it is possible to obtain a colored molding product without adopting a coloring step. With this arrangement, a colored molding product is easily obtained at low cost.

To achieve the foregoing objective, the molding product of the present invention, such as an optical unit for an image forming device and a developing unit and a toner storage member for an electrophotographic device, is characterized by being manufactured by molding the above-mentioned molding material of the present invention.

According to this arrangement, since the molding product of the present invention is manufactured by molding the above-mentioned molding material, it is possible to effectively recycle waste toner, which cannot be shipped as products, as a filler. Further, the molding material has high fluidity and excellent moldability. Moreover, since the molding material includes a colorant in a toner ingredient constituting the waste toner, it is possible to obtain a colored molding product such as a developing unit and a toner storage member for an electrophotographic device, without adopting a coloring step.

For these reasons, the foregoing arrangement allows to easily and inexpensively obtain a molding product which has excellent physical properties such as tensile strength, flexural rigidity, and flexural strength and is usable for various purposes.

When the molding product is a developing unit or a toner storage member for an electrophotographic device, manufacturing the device or member by molding the foregoing molding product using waste toner makes it possible to inexpensively obtain the unit or member in which no toner fusing and degradation due to toner are observed. Especially, when, for instance, waste toner including a black colorant, e.g. carbon black, as a colorant of a toner ingredient is adopted as the molding material, it is possible to prevent stray light and cause the dirt due to fly toner to be inconspicuous, without carrying out a blacking process.

Further, to achieve the foregoing objective, an optical unit for an image forming device, e.g. a reading unit and writing unit, is manufactured by molding the molding material of the present invention. This optical unit is characterized in that the waste toner includes, as a colorant constituting a toner ingredient, a black colorant such as carbon black.

According to this arrangement, the optical unit is manufactured by molding the molding material including the waste toner so that it is possible to effectively recycle the waste toner, which cannot be shipped as products, as a filler. Further, the molding material has high fluidity and excellent moldability. Moreover, the molding material includes a colorant in a toner ingredient constituting the waste toner. Thus, when the waste toner including a black colorant, e.g. carbon black, as a colorant of a toner ingredient is adopted as the molding material, it is possible to prevent stray light and cause the dirt due to fly toner to be inconspicuous, without carrying out a blacking process. According to the foregoing arrangement, moreover, it is possible to obtain an optical unit in which no toner fusing and degradation due to toner, by manufacturing the optical unit by molding the molding material adopting the waste toner.

To achieve the foregoing objective, the method of molding the molding product of the present invention is characterized in that the modified polyphenylene ether and the waste toner are kneaded in a kneader, while continuously supplying the modified polyphenylene ether and the waste toner to the kneader at a constant rate.

According to this arrangement, as in the foregoing description, it is possible to effectively recycle waste toner which cannot be shipped as products as a filler, thereby allowing to easily and inexpensively obtain a molding product which has excellent physical properties such as tensile strength, flexural rigidity, and flexural strength and is usable for various purposes. Further, since the foregoing method allows to mix the above-mentioned substances always at a constant ratio, it is possible to retrain the inconsistency of the qualities, the modified polyphenylene ether and the waste toner can be mixed (kneaded) more constantly than the case of batch processing, and the degradation of tensile elongation properties of the molding material to be obtained can be restrained.

To achieve the foregoing objective, the method of recycling the waste toner of the present invention is characterized in that the waste toner is fused and kneaded with modified polyphenylene ether, and used as a molding material.

According to this arrangement, the waste toner is fused and kneaded with the modified polyphenylene ether and then molded as the molding material, so that the waste toner which cannot be shipped as products is effectively recycled.

The waste toner preferably includes a toner ingredient including styrene-acrylic resin. The toner ingredient is mainly made of binder resin, and resin typically used as this binder resin, e.g. styrene-acrylic resin is compatible with modified polyphenylene ether. For this reason, using these substances simultaneously does not cause degradation of the physical properties, such as tensile strength, flexural rigidity, and flexural strength, of a molding product to be obtained. Thus, the waste toner can be adopted as a filler for a molding material including modified polyphenylene ether, and hence using waste toner which cannot be shipped as products, it is possible to inexpensively manufacture a molding product which has excellent physical properties such as tensile strength, flexural rigidity, and flexural strength and is usable for various purposes.

Further, since the molding material includes the waste toner, the fluidity of the molding material improves, and hence the moldability of this molding material is better than a molding material not including waste toner.

Moreover, since the waste toner which cannot be shipped as products includes a colorant, it is possible to obtain a colored molding product without adopting a coloring step. With this arrangement, a colored molding product is easily obtained at low cost. Thus, the foregoing method makes it possible to effectively recycle waste toner.

For a fuller understanding of the nature and advantages of the invention, reference should be made to the ensuing detailed description taken in conjunction with the accompanying drawings.

BRIEF DESCRIPTION OF THE DRAWINGS

FIGS. 1(a)–1(c) illustrate respective charts indicating the relationship between (i) an amount of a toner material as waste toner included in a molding material made of modified polyphenylene ether and the toner material and (ii) the physical characteristics of a molding product obtained through a package top feed process.

FIG. 5(a) is a schematic diagram of a system for manufacturing a molding product in accordance with an embodiment of the present invention.

FIG. 5(b) is a cross-section of FIG. 5(a) in the direction of A–A'.

FIG. 5(c) is a cross section of FIG. 5(b) in the direction of B–B'.

DESCRIPTION OF THE EMBODIMENTS

Figure 2:
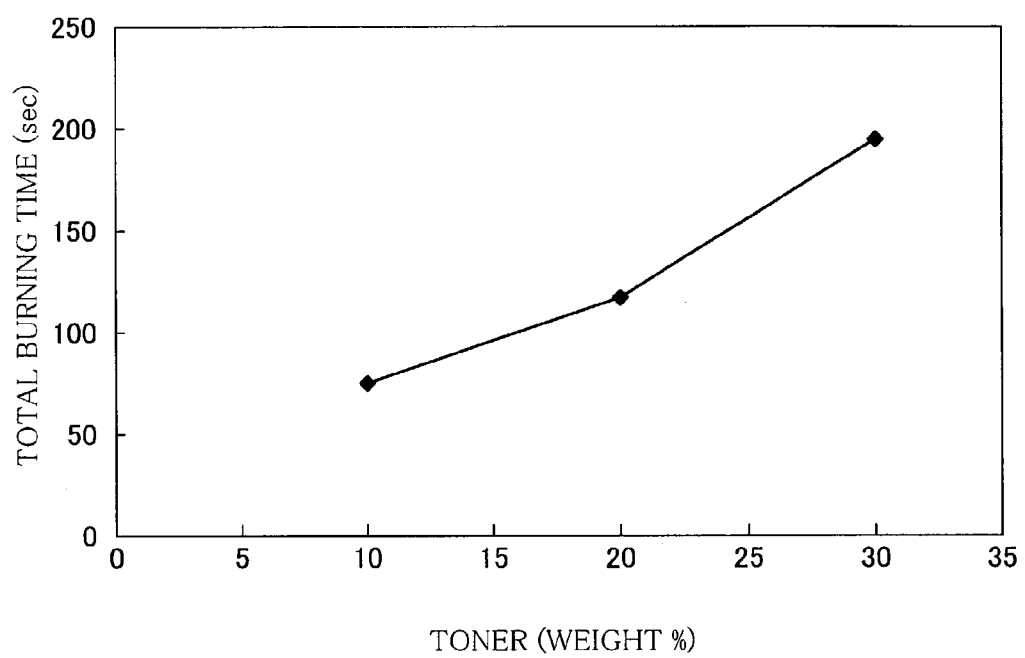
FIG. 2 illustrates a chart indicating the relationship between (i) an amount of a toner material as waste toner included in a molding material made of modified polyphenylene ether and the toner material and (ii) a total burning time in UL-94 vertical flammability testing of an obtained molding product.

The followings will describe an embodiment of the present invention.

The present invention relates to a method of recycling waste toner, and in the present embodiment, waste toner is mixed with modified polyphenylene ether, more specifically waste toner is fused and kneaded so that a resin compound is formed, and this resin compound is used as a molding material.

In the present invention, a toner ingredient in waste toner or a toner material used as waste toner (hereinafter, the toner material may be described as a waste toner material in some cases) indicates defective toner and substandard toner spun off during a toner manufacturing step, etc., unnecessary toner ingredient resin generated in steps before a grinding step, and unused residual waste toner.

It is noted that the defective toner is such as toner which is discarded immediately after switching the type of a product produced in a plant and thus has unstable toner characteristics. Concrete examples of this defective toner include toner which is not properly charged and toner with poor fixing characteristics.

The above-mentioned substandard toner refers to fine/coarse particles produced on the occasion of toner manufacturing, whose particle sizes are either too small or too large according to a standard particle size, i.e. toner whose particle sizes are not in conformity with a particle size preferable for products. Concrete examples of this substandard toner include fine particles removed on the occasion of manufacturing 8 μm toner, and coarse particle toner.

The unused residual waste toner indicates residual toner which is not used for products, such as toner which is recovered during cleaning in the manufacturing step even if the same can be used for products, toner removed from a toner plant on the occasion of switching the type of a product produced in the plant, and toner which adheres to walls etc. of a toner cartridge so as not to be used for image forming.

In the present invention, what are collectively termed waste toner are: the above-described toner material or toner ingredient resin to be discarded, i.e. toner ingredient resin, defective toner, substandard toner, and unused residual waste toner which are unnecessarily generated in the manufacturing process; and recovered residual toner which contains ingredients other than toner such as carriers and is recovered after an image forming process.

Also, the present invention adopts waste toner included in toner for electro-photography, which is used for electrophotographic image forming devices.

A toner ingredient (waste toner material) constituting waste toner typically includes binder resin and a colorant. The binder resin is made of thermoplastic resin, and used as a chief ingredient of the toner ingredient.

Concrete examples of the binder resin constituting the toner ingredient includes styrene resins and polyester resin.

More specifically, the styrene resins are further divided into two types, namely a homopolymer including styrene or styrene substitute product and a copolymer including styrene or styrene substitute product, and concrete examples of the styrene resins include polystyrene, polychlorostyrene, poly-α-methylstylene, styrene-chlorostyrene copolymer, styrene-propylene copolymer, styrene-butadiene copolymer, styrene-vinyl chloride copolymer, styrene-vinyl acetate copolymer, and styrene-acrylic resins.

Concrete examples of the styrene-acrylic resins indefinitely include: styrene-(meth)acrylate copolymers such as styrene-acrylate copolymer and styrene-methacrylate copolymer; styrene-(meth)acrylate ester copolymers such as styrene-methyl acrylate copolymer, styrene-ethyl acrylate copolymer, styrene-butyl acrylate copolymer, styrene-octyl acrylate copolymer, styrene-phenyl acrylate copolymer, styrene-methyl methacrylate copolymer, styrene-ethyl methacrylate copolymer, styrene-butyl methacrylate copolymer, and styrene-phenyl methacrylate copolymer; styrene-methyl α-chloroacrylate copolymer; styrene-acrylonitrile-(meth) acrylate ester copolymer. Among these kinds of styrene-acrylic resins, especially styrene-acrylic resins are suitably used.

As the binder resin in the waste toner recycled in the present invention, styrene resins and polyester resin are suitably adopted, and styrene-acrylic resins are particularly suitable.

That is to say, it is preferable that the molding material in accordance with the present invention is made of a resin compound including modified polyphenylene ether and waste toner, and the waste toner includes styrene-acrylic resins as a toner ingredient. In the present embodiment, the waste toner including styrene-acrylic resins (hereinafter, this waste toner will be referred to as styrene-acrylic-resins-containing waste toner) indicates waste toner in which styrene-acrylic resins are used as toner particles.

Concrete examples of the colorant included in the waste toner indefinitely include conventional pigments and dyes such as carbon black, titanium oxide, zinc white, alumina white, calcium carbonate, ultramarine, Prussian blue, phthalocyanine blue, phthalocyanine green, hansa yellow G, rhodamine dye, chrome yellow, quinacridone, Benzedrine yellow, rose bengal, triarylmethane dye, anthraquinone dye, and monoazo pigment. At least one of these colorants is accordingly used.

When carbon black is adopted as the colorant (pigment), a coloring step is unnecessary on the occasion of producing a black resin molding product as a molding product of the present invention.

Note that, although the waste toner can be recovered and recycled irrespective of the colors thereof, it is preferable to recover the waste toner color by color or by similar colors, more preferably recover the waste toner type by type, and mix appropriate types of the waste toner so as to obtain a molding product with a desired color. To obtain a colored molding material for a molding product with a desired color, typically it is necessary to add a colorant to the molding material. However, with the arrangement above, the toner ingredient constituting the waste toner already includes a colorant so that it is unnecessary to add a colorant in order to obtain a colored molding product, and hence a step for adding a colorant can be omitted.

Typically, in the toner manufacturing step, a colorant is added to the toner to the extent that the toner can form a visible image when developed. For instance, an amount of the colorant to be included is not less than 1 weight unit and not more than 20 weight units for 100 weight units of binder resin, more preferably in the range of 3 to 15 weight units for 100 weight units of binder resin. Thus, the waste toner typically includes a colorant at these rates.

Further, the toner ingredient in the waste toner may include additives such as a charge control agent and an offset preventing agent (mold-releasing agent), as occasion demands.

The charge control agent is charged either positively or negatively. Concrete examples of the positively-charged charge control agent indefinitely include nigrosine dyes, quaternary ammonium salt compounds, aminosilan compounds, triphenylmethane compounds, imidazole compounds, and polyamine resin. Meanwhile, concrete examples of the negatively-charged charge control agent include: metal-containing azo dyes such as chrome, cobalt, aluminum, and iron; metallic sallicylate compound; metallic alkyl salicylate compound; and calixarene compound.

Among the above-mentioned charge control agents, positively-charged dyes such as nigrosine dye, quaternary ammonium salt compound, and aminosilane compound are typically used.

Concrete examples of the offset preventing agent include polypropylene resin and polyethylene wax.

The waste toner of the present invention may be constituted sorely of the toner ingredient as described above, or may include a carrier for an electrophotographic developing agent, etc. in addition to the toner ingredient.

The above-mentioned carrier of the present invention is a carrier ingredient which is made of an inorganic magnetic substance such as magnetite and ferrite and constitutes an electrophotographic developing agent. Concrete examples of this carrier indefinitely include inorganic magnetic substances such as iron powder, magnetite, ferrite, and triiron tetroxide.

The addition of the carrier to the waste toner makes it possible to effectively recycle a carrier discharged on the occasion of replacing a developing device, i.e. a carrier recovered on the occasion of replacing a developing agent of an electrophotographic device, the replacement being carried out each time when a predetermined number of paper is printed. For this reason, the carrier can be recycled. The addition of the carrier to the waste toner also makes it possible to increase the weight per unit of an obtained resin molding product. With this arrangement, the natural frequency of the resin molding product decreases so that the anti-vibration property of modified polyphenylene ether is further improved. Thus, it is possible to improve the anti-vibration property of the obtained resin molding product.

Apart from other typical ingredients such as internal additives like wax, the waste toner may, as occasion demands, include external additives such as fine particles of colloidal silica, titanium oxide, alumina, and fatty acid metallic salt which are added on the occasion of toner manufacturing, in order to improve the fluidity of toner, control frictional charge quantity, and improve the easiness of cleaning, on condition that the compatibility between the waste toner and the polyphenylene ether is not inhibited.

The modified polyphenylene ether (hereinafter, will be referred to as modified PPE) of the present invention includes polyphenylene ether (PPE), and is so-called engineering plastic obtained by alloying the PPE with general-purpose polystyrene (GPPS), high-impact styrene resin (HIPS), acrylonitrile-butadiene-styrene copolymer (ABS resin), polyamide (PA), etc., therefore excelling heat resistance, mechanical properties, electric properties, etc.

As the foregoing modified polyphenylene ether, it is possible to adopt off-the-shelf modified polyphenylene ether. Concrete examples of the off-the-shelf modified polyphenylene ether indefinitely include modified polyphenylene ether (trade name: "Xyron") made by Asahi Kasei Corp. and modified polyphenylene ether (trade name: "Jupiace") made by Mitsubishi Engineering-Plastic Corp. In particular, "Xyron" (grade 100V) is preferably adopted among the above.

An amount of the waste toner with respect to the modified polyphenylene ether is appropriately determined in accordance with factors such as the combination of the waste toner and the modified polyphenylene ether and physical properties desired to be obtained, and hence not particularly limited. However, a waste toner material (i.e. toner ingredient in the waste toner) to be used is preferably more than 0 weight % and not more than 20 weight % of the total of the modified polyphenylene ether and the waste toner material, in other words, the ratio of the waste toner material with respect to the modified polyphenylene ether on a weight basis is preferably not more than 20/80. When the ratio of the waste toner material with respect to the modified polyphenylene ether on a weight basis is more than 20/80, tensile elongation properties and flame retardance could significantly deteriorate. Also, shock resistance is likely to deteriorate when the amount of the waste toner material to be used increases with respect to the modified polyphenylene ether.

Thus, the waste toner can be effectively used when the amount (ratio on a weight basis) of the waste toner material, especially the waste toner material including styrene-acrylic resins, with respect to the modified polyphenylene ether is within the above-mentioned range, and this makes it possible to provide a molding product with better tensile strength, flexural rigidity, flexural strength, tensile elongation properties, and flame retardance than a molding product made of modified polyphenylene ether. Further, the above-described arrangement allows to provide a molding product which has better flame retardance than a molding product made of modified polyphenylene ether and meets V-1 standard of UL-94 vertical flammability testing.

Moreover, by adding the waste toner, especially the waste toner including the styrene-acrylic resins, to the modified polyphenylene ether, it is possible to improve the fluidity of an obtained molding material to be better than that of a molding material made of modified polyphenylene ether. More specifically, the waste toner material of the waste toner, especially of the waste toner containing the styrene-acrylic resins, is included not less than 5 weight % of the total of the modified polyphenylene ether and the waste toner material, and hence an MI value indicating fluidity is improved to be not less than 1.2 times higher than that of a molding material with no waste toner. On this account, when the molding product is, for instance, manufactured by an injection molding pressure method, it is possible to decrease an injection molding pressure, and thus moldability is improved.

Further, when the waste toner material is included not less than 10 weight % of the total of the modified polyphenylene ether and the waste toner material, an MI value indicating fluidity is improved to be not less than 1.5 times higher than that of a molding material with no waste toner. On this account, when the molding product is, for instance, manufactured by an injection molding pressure method, it is possible to decrease an injection molding pressure, and thus moldability is further improved.

For this reason, in consideration of recyclable amount, fluidity, tensile strength, flexural rigidity, flexural strength, tensile elongation properties, and flame retardance, the amount of the waste toner, especially the amount of the waste toner including the styrene-acrylic resins, to be added to the modified polyphenylene ether is preferably not less than 5/95 and not more than 20/80 (waste toner material/modified polyphenylene ether) at a ratio on a weight basis, and more preferably not less than 10/90 and not more than 20/80 at a ratio on a weight basis.

The foregoing molding material may further include flame retardant. Concrete examples of the flame retardant indefinitely include: halogen flame retardants such as tetrabromobisphenol-A (TBA), 2,2-bis(4-hydroxy-3,5-dibromophenyl)propane, hexabromobenzene (HBB), tris(2,3-dibromopropyl)isocyanurate (TAIC-6B), 2,2-bis(4-hydroxyethoxy-3,5-dibromophenyl)propane (TBA-EO), decabromodiphenyl oxide (DBDPO), and halo-polyphosphate; phosphoric flame retardants such as ammonium phosphate, tricresyl phosphate (TEP), tris($\beta$-chloroethyl)phosphate (CLP), trisdichloroplopyl phosphate (CRP), cresyldiphenyl phosphate (CDP), xylenyldiphenyl phosphate (XDP), acidic phosphate ester, and nitrogen phosphorous compound; and inorganic flame retardants such as red phosphorous, tin oxide, antimony trioxide, zirconium hydroxide, barium metaborate, aluminum hydroxide, and magnesium hydroxide. At least one of these flame retardants is appropriately used.

Among the flame retardants above, phosphate ester not including halogen is particularly preferable, since using flame retardants not including halogen allows to prevent environmental pollution and facilitates the recycle of an obtained molding product.

As the waste toner included in the molding material increases, flame retardance of the molding product to be obtained tends to deteriorate. In particular, when the waste toner, especially the styrene-acrylic-resins-containing waste toner, is included more than the above-mentioned ratio of 20/80, frame retardance of the molding product could deteriorate. Thus, when the molding material includes the waste toner, especially the styrene-acrylic-resins-containing waste toner, more than the ratio of 20/80, the molding material preferably contains greater amount of flame retardant. In this manner, the inclusion of a flame retardant in the molding material allows to obtain a molding product with superior flame retardance, even if the molding material contains greater amount of waste toner.

The amount of the flame retardant to be included is, although not particularly limited, preferably not less than 3 weight % and not more than 30 weight % of the total of the modified polyphenylene ether and the waste toner material, and more preferably not less than 5 weight % and not more than 20 weight % of the total. When the amount of the flame retardant is less than 3 weight %, the flame retardance could deteriorate. Meanwhile, when the amount of the flame retardant is more than 30 weight %, the heat resistance could deteriorate.

As a molding material, it is possible to use the resin compound of the present embodiment, without any additional substances. However, a flame retardant may be additionally mixed into the resin compound as described above. Apart from the above-mentioned modified polyphenylene ether, waste toner, and flame retardant, the resin compound may include additives for molding materials, such as stabilizer, ultraviolet absorbing agent, filler, hardener, and hardening accelerator may be added to the resin compound, on condition that the addition does not deteriorate the physical properties of the molding material.

In this manner, the molding material in accordance with the present invention is obtained. The molding material may be molded by fusing the foregoing modified polyphenylene ether and waste toner and then kneading the same. It is noted that the foregoing resin compound, i.e. the molding material of the present embodiment may be either molded as it stands or palletized as pellets for injection molding, before being molded.

A method of mixing ingredients of the molding material, an order of the ingredients, and a molding method of the molding product are not particularly limited. However, to restrain the degradation of the physical properties, especially tensile elongation properties, of the molding product to be obtained, it is preferable that the molding product is molded by continuously feeding the modified polyphenylene ether and waste toner to a kneader at a constant rate, while kneading these ingredients.

Now, the followings will describe a manufacturing method of the molding product in accordance with the present invention. The description exemplifies such an arrangement that, to obtain a molding product by fusing and kneading the foregoing modified polyphenylene ether and waste toner in a kneader, the modified polyphenylene ether and waste toner are individually fed to the kneader. It is noted that conventional methods for the preparation of the waste toner, i.e. conventional manufacturing and recovering methods of the toner are adopted here so that the methods are not limited to any particular ones. Therefore detailed descriptions of the manufacturing and recovering methods of the toner are omitted from the description.

First, concerning a system for manufacturing the molding product in accordance with the present embodiment, a description is provided with reference to FIGS. 5(a)–5(c), 6(a), and 6(b). FIG. 5(a) is a schematic diagram of a system for manufacturing the molding product in accordance with an embodiment of the present invention, and FIG. 5(b) is a cross-section of FIG. 5(a) in the direction of A–A', looking down on a substantial part of a biaxial continuous extrusion kneader of FIG. 5(a). FIG. 5(c) is a cross-section of FIG. 5(b) in the direction of B–B', illustrating a side view of the substantial part of the biaxial continuous extrusion kneader of FIGS. 5(a) and 5(b).

It is noted that the system for manufacturing the molding product in accordance with the present embodiment is not limited to the arrangement illustrated in FIGS. 5(a)–5(c), 6(a), and 6(b). Devices used for the manufacturing system may be off-the-shelf devices such as a typical kneader/extruder and a typical material weighing machine/feeder, and kneading/extruding conditions are not particularly limited as well.

The kneader/extruder adopted in the present embodiment is a biaxial continuous extrusion kneader "HYPERKTX30 XHT HS" made by Kobe Steel Ltd., and two feeders: a precise volumetric/gravimetric feeder in which a volumetric weighing method is combined with a gravimetric weighing method; and a gravimetric feeder.

As FIG. 5(a) illustrates, a biaxial continuous extrusion kneader 10 in accordance with the present embodiment includes a barrel 1 internally divided into a plurality of sections. The barrel 1 includes heating means such as an electric heater (not illustrated) and cooling means such as cooling pipes therein, and a temperature control panel which is provided outside of the barrel 1 controls a temperature of the barrel 1 to be a desired value.

Inside the barrel 1, as illustrated in FIGS. 5(b) and 5(c), two screws 11 are provided, intermeshing with each other and rapidly spinning in the same direction at the velocity of 100–500 rpm. Each of the screws 11 is arranged in such a manner that two differently-shaped screw blades 13a and 14a, the respective blades constituting a transfer screw 13 and a kneading screw 14, are provided around a rotation axis 12.

At one leading edge (downstream edge) of the barrel 1, a die 2 is provided as a molding product extrusion opening, and at the other leading edge (i.e. an upstream edge; opposite to the molding product extrusion opening at which the die 2 is provided), a hopper 3 is provided as a material feed opening (first material feed opening).

The method for manufacturing the molding product of the present embodiment is arranged in such a manner that the modified polyphenylene ether and waste toner (waste toner material) which are materials are individually provided to the kneader. That is to say, in the present embodiment, the modified polyphenylene ether and waste toner (waste toner material) are individually provided to the feeder and the continuous extrusion kneader.

Further, in the method for manufacturing the molding product in accordance with the present embodiment, the modified polyphenylene ether and waste toner (waste toner material) are measured using a weighing machine so that these materials are fed to the kneader at a predetermined mixture ratio.

More specifically, pellets of the modified polyphenylene ether with approximately 1 mm particle size and the waste toner (waste toner material) with 1–5 μm particle size are continuously introduced into the continuous extrusion kneader.

This arrangement is implemented for the following reason: If the pellets and waste toner are introduced into the hopper 3 all at once, the fall velocity is different between these two materials due to the difference of the particle size and weight, and hence these materials are not mixed at a constant ratio. Thus, the kneading product of the fused pellet and waste toner has different mixture ratios at an early stage and an end stage of the extrusion, and consequently there is the possibility of failing to obtain a molding material and molding product with desired characteristics.

Although the feeder for measuring the modified polyphenylene ether and waste toner is not limited to any particular types, it is preferable that a gravimetric feeder is used for measuring the modified polyphenylene ether while a precise feeder in which a volumetric weighing method is combined with a gravimetric weighing method is used for measuring the waste toner, in consideration of the shapes of the respective materials. The fine particles of the toner are irregularly distributed so that, if, for instance, a volumetric screw feeder is used for measuring the waste toner, pulsation at intervals around 5 seconds occurs. The use of the feeder in which a volumetric weighing method is combined with a gravimetric weighing method resolves this problem.

In the present embodiment, the modified polyphenylene ether is, as illustrated in FIGS. 5(a)–5(c), introduced into the screw transfer section in the barrel 1 through a hopper opening 3a of the hopper 3 by a gravimetric feeder 21, and then gradually preheated in the course of transfer to the die 2 by the transfer screw 13.

In contrast, as illustrated in FIG. 5(a), materials other than the modified polyphenylene ether, such as the waste toner, are either introduced (package top feed) into the hopper opening 3a of the hopper 3 by a precise feeder 22 in which a gravimetric method is combined with a volumetric method, or directly introduced (side-fed) into a vent opening (second material feed opening) which is an opening section of a kneading section (C4 in FIG. 5(a)), provided in the middle of the biaxial continuous extrusion kneader 10.

Figure 6:
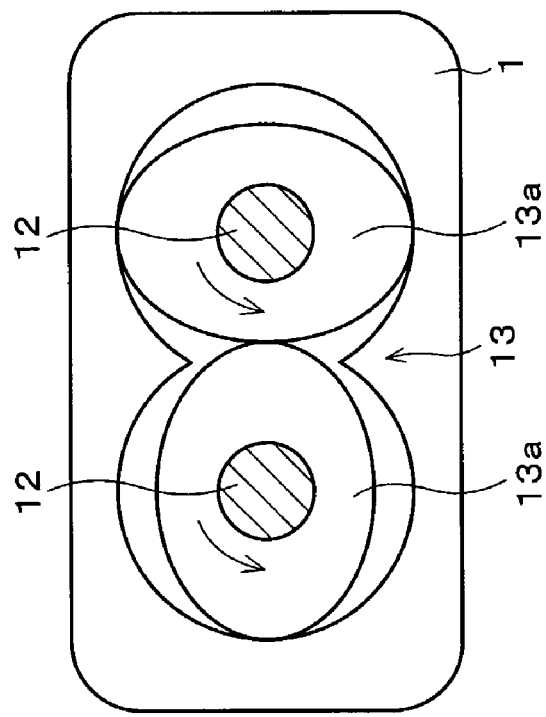
FIG. 6(a) illustrates the shape of a kneading screw in a kneading section of a biaxial continuous extrusion kneader illustrated in FIGS. 5(a)–5(c).
FIG. 6(b) illustrates the shape of a transfer screw of a screw transfer section in the biaxial continuous extrusion kneader illustrated in FIGS. 5(a)–5(c).
Figure 6:
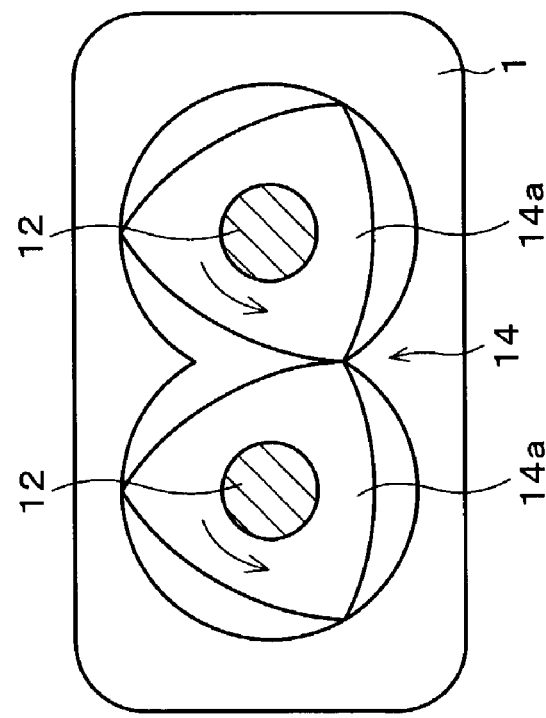

The kneading screw 14 of the kneading section (C4) is, as illustrated in FIG. 6(a), arranged such that the screw blades 14a each having protrusions on its three sides are provided around the rotating axis 12, and this shape of the kneading screw 14 yields higher dispersion properties than the transfer screw 13 in which the elliptic screw blades 13a are provided around the rotation axis 12. Thus, since strong shearing force is applied to the modified polyphenylene ether and fine particles such as the waste toner by the kneading screw 14, these materials are dispersed due to their self-heating, and hence changed from a solid or semi-fused state to a fused state.

Then these fused materials, that is, the molding material of the present invention is transferred to the die 2, i.e. an exit (molding product extrusion opening) of the biaxial continuous extrusion kneader 10, by the transfer screw 13 provided downstream from the kneading section (C4). The die 2 provided at the exit of the biaxial continuous extrusion kneader 10 of the present embodiment includes a strand-type die head with three discharge openings 4 mm in diameter, and the fused molding material having been transferred to the die 2 is extruded to the outside through the discharge openings. The extruded molding material is cooled in a cooling bath 23 provided outside of the biaxial continuous extrusion kneader 10 and thus solidified, then the molding material is cut by a cutting means 24 such as a strand cutter, and consequently pelletized to be pellets for injection molding.

Since the molding material fused in the biaxial continuous extrusion kneader 10 is pelletized when passing through the die 2 and the particle size thereof is determined at this time, it is possible to almost minimize the generation of fine particles in the pelletizing step. For this reason, it is possible to carry out the pelletization further efficiently.

The size of the biaxial continuous extrusion kneader 10 is preferably large enough to comfortably accommodate the screw transfer section and kneading section for the kneading product and a plurality of vent openings, and more preferably arranged such that, providing the inside diameter of the barrel 1 is D mm and the length from the material feed opening, i.e. the hopper 3 to the exit is L mm, the ratio of L/D is not less than 7 (L/D≧7). The present embodiment adopts a device of L/D=40.2 (11 barrels) as the biaxial continuous extrusion kneader 10. With this arrangement, it is possible to improve feed efficiency of the materials in the pelletizing step.

Other characteristics and operating conditions of the device is determined as follows: motor 15 kW (DC); maximum speed of the screw 11 526 rpm; breaker standard; screen mesh not provided; die 2 three openings each having discharge opening diameter of 4.0 mm; vacuum vent C9; open vent C4 on the occasion of the package top feed and C7 on the occasion of the side feed.

The following will describe examples of preferable kneading conditions on the occasion of the package top feed and the side feed. It is noted that the kneading conditions in accordance with the present embodiment are not limited to the below, and in the following examples, the conditions other than the below-specified ones are identical with those described above.

TABLE 1

| | WASTE TONER MATERIAL (weight %) | TOTAL FEED AMOUNT (MODIFIED PPE + WASTE TONER MATERIAL) (kg/h) | OPEN VENT | ROTATION SPEED OF SCREW (rpm) | TEMPERATURE SETTINGS (C. °) C1–C5 | C6–C10 | DIE | |
|---|---|---|---|---|---|---|---|---|
| SIDE FEED | 10 | 20 | C7 | 320 | 100 | 140 | 200 | EMBODIMENT 1 |
| | 20 | 20 | C7 | 320 | 100 | 140 | 200 | EMBODIMENT 2 |
| | 30 | 13.3 | C7 | 250 | 100 | 140 | 200 | EMBODIMENT 3 |
| PACKAGE TOP FEED | 10 | 20 | C4 | 250 | 120 | 160 | 200 | EMBODIMENT 4 |
| | 20 | 20 | C4 | 320 | 100 | 160 | 200 | EMBODIMENT 5 |
| | 30 | 13.3 | C4 | 250 | 100 | 140 | 200 | EMBODIMENTS 6–8 |

Kneading conditions:
Biaxial Continuous Extrusion Kneader; "HYPERKTX30 XHT HS" made by Kobe Steel Ltd.
Screw; 32 cm in diameter (φ)
L/D; 40.2 (11 barrels)
Die Hole; 3 openings 4 mm in diameter (φ)

Although the method of obtaining pellets for injection molding by means of the continuous extrusion kneader 10 with the strand-type die head has been described above, the present embodiment is not limited to this arrangement. For instance, the method may be arranged in the following manner: After a molding material is fused by a continuous extrusion kneader and extruded therefrom in the form of plate or aggregate, the molding material is cooled and solidified. The solidified material is then crushed by a crusher, and consequently pelletized and screened by a screen mesh to be pellets with a constant particle size.

Further, although it has been described that the second material feed opening is provided in the kneading section (C4) in the middle of the biaxial continuous extrusion kneader 10, the present embodiment is not limited to this arrangement. The second material feed opening may be provided in any parts of a kneader/extruder, e.g. the biaxial continuous extrusion kneader 10, in accordance with the composition of the waste toner, e.g. the type of the binder resin constituting the waste toner, and hence there is no particular limitation to this.

As described above, two feeders are provided in the kneader/extruder, and after the modified polyphenylene ether is introduced into the kneader/extruder, the waste toner is introduced. More specifically, the modified polyphenylene ether is introduced into the kneader-extruder and heat-stirred so that the modified polyphenylene ether is sufficiently fused, and then the waste toner is introduced into the kneader/extruder so that the contents are kneaded. As a result, the waste toner is dispersed in the modified polyphenylene ether further evenly.

Although the method of feeding the modified polyphenylene ether and waste toner individually to the feeder and the continuous extrusion kneader has been described above, there are other methods of kneading the molding polyphenylene ether and waste toner, including such an arrangement that the pellets of the modified polyphenylene ether is fused and solidified, crushed, etc. so that the size of the particles of the modified polyphenylene ether is caused to be more or less identical with the size of the particles of the waste toner, and then the modified polyphenylene ether and waste toner are mixed all at once. By causing the particle size of the modified polyphenylene ether to be more or less equal to the particle size of the waste toner in advance, it is possible to improve dispersion properties and kneading (mixing) properties of these materials.

Alternatively, instead of introducing the pellets sorely made of modified polyphenylene ether into the biaxial continuous extrusion kneader 10, pellets produced by fusing and mixing modified polyphenylene ether and waste toner at a constant rate are produced as a masterbatch, and then these pellets and modified polyphenylene ether are fused and kneaded (mixed) together at the foregoing desired ratio of modified polyphenylene ether to waste toner. This arrangement also allows to improve dispersion properties and kneading (mixing) properties of the modified polyphenylene ether and waste toner.

For instance, in the case of the foregoing package top feed, the modified polyphenylene ether and waste toner (waste toner material) are kneaded in the kneader at a final mixture ratio, so that a kneading product at the final mixture ratio is obtained by a single step. However, the molding product at the final mixture ratio, for instance a molding product including 10 weight % waste toner, may be alternatively obtained in the following manner: As a masterbatch, pellets composed of, for instance, modified polyphenylene ether and 20 weight % waste toner (waste toner material) are produced in the kneader, and these pellets and pellets sorely composed of modified polyphenylene ether are fed to an injection molding machine.

It is noted that since the ratio of the waste toner in the masterbatch is not limited to the above, modified polyphenylene ether and waste toner (waste toner material) may be mixed at a ratio of 1:1. Further, although, in the above-mentioned method, a desired kneading product at a final mixture ratio is obtained through two steps, the present embodiment is not limited to this arrangement so that a kneading product at a final mixture ratio may be obtained by diluting the masterbatch a plurality of times.

Further, although the foregoing description exemplifies a biaxial continuous extrusion kneader as the kneader/extruder, the present embodiment is not limited to this arrangement so that a uniaxial continuous extrusion kneader may be adopted. However, a uniaxial continuous extrusion kneader entangles a large amount of air due to a uniaxial screw and hence the supply of materials could be inconsistent. For this reason, it is preferable to adopt a biaxial continuous extrusion kneader with two screws. The use of a biaxial continuous extrusion fusing kneader allows to avoid the inconsistence of the supply of materials. Further, the use of this kneader makes it possible to disperse the waste toner in the modified polyphenylene ether more evenly, and knead these materials more evenly.

The molding material in accordance with the present embodiment is suitably used for molding devices with optical systems, e.g. optical units such as a reading unit and writing unit, a developing unit for an electrophotographic device, and a toner storage member. For instance, the foregoing pellets pelletized by the biaxial continuous extrusion kneader 10 are, as pellets for injecting molding, suitably used for molding optical units, a developing unit for an electrophotographic device, and a toner storage member.

That is to say, members of the present embodiment, namely: optical units for the image forming device, for instance, a reading unit and writing unit; a developing unit for the electrophotographic device; and a toner storage member, are produced by molding the molding material of the present embodiment.

Figure 7:
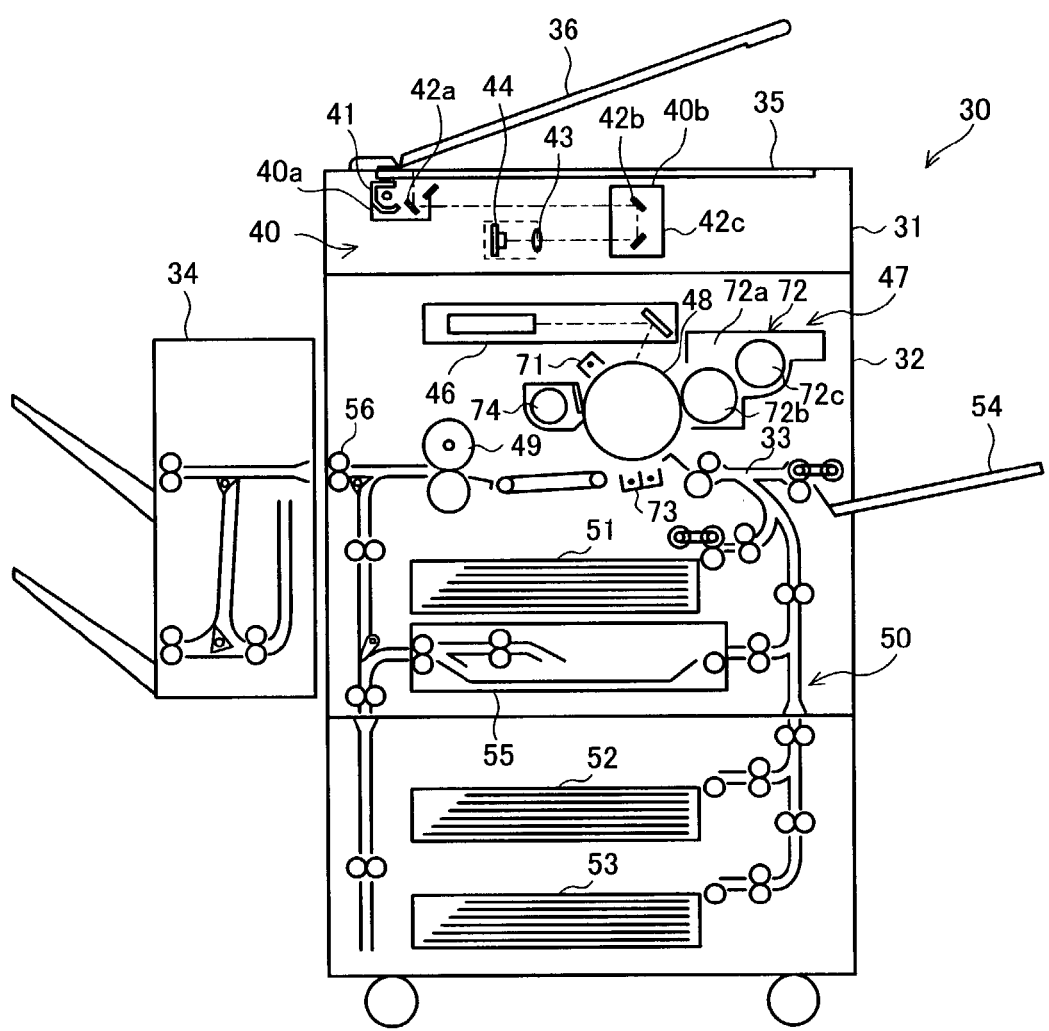
FIG. 7 is a schematic diagram of an image forming device of an embodiment of the present invention, which is provided with an optical unit, a developing unit, a toner storage member, etc. and adopts an electrophotographic method.

Next, referring to FIG. 7, the followings will describe an image forming device adopting an electrophotographic method (i.e. electrophotographic image forming device), including the aforementioned optical units, developing unit, and toner storage member of the present embodiment.

The image forming device illustrated in FIG. 7 is a digital photocopier 30, and the main body of the digital photocopier 30 is roughly composed of a scanner section 31 and a laser recording section 32.

Figure 8:
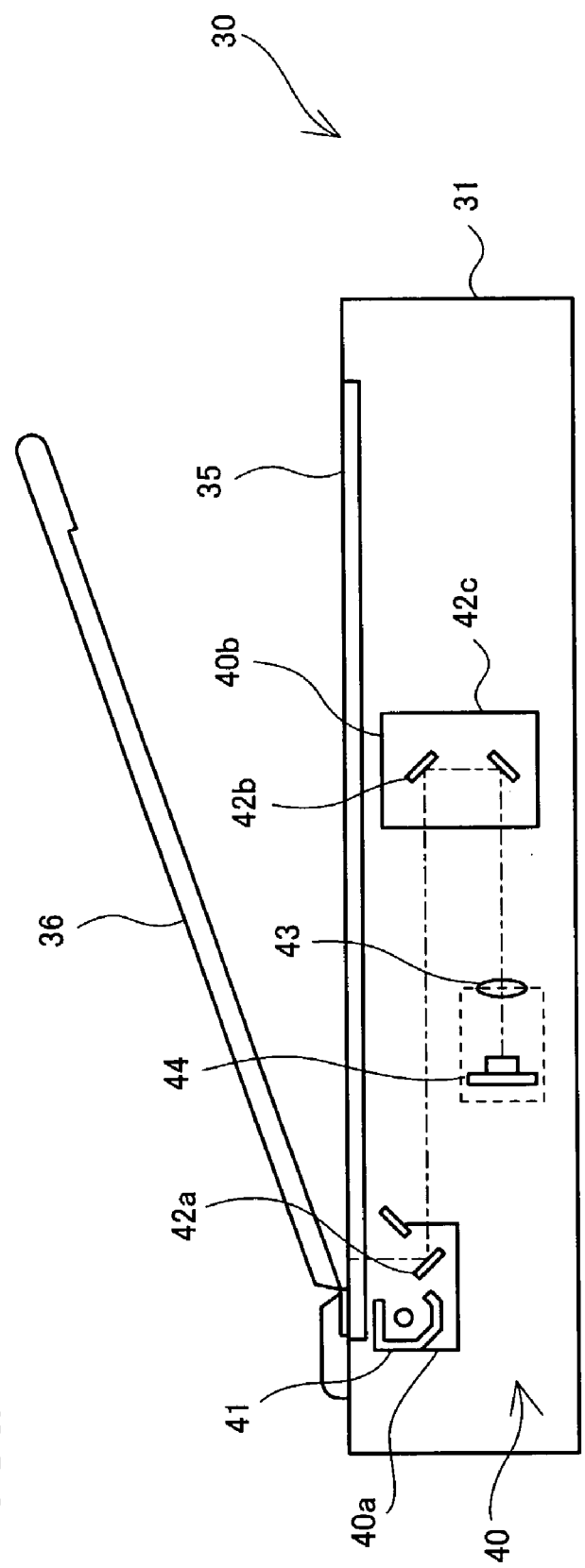
FIG. 8 is a schematic diagram of a scanner section of the image forming device illustrated in FIG. 7.

The scanner section 31 is, as illustrated in FIGS. 7 and 8, composed of: a document supporter 35 made of clear glass; a reversing automatic document feeder (RADF) 36 for automatically feeding documents to the document supporter 35; and a scanner unit 40 which is a document image reading unit as an optical unit (reading unit) for scanning the image of a document on the document supporter 35 in order to read the image.

The image of a document having been read in the scanner section 31 is, as image data, supplied to an image data input section (specifically described below). Then the image data is subjected to predetermined image processing.

The RADF 36 is such a device that a plurality of documents are set all at once on a document tray (not illustrated), and the documents are automatically fed to the document supporter of the scanner unit on one-by-one basis. To cause the scanner unit 40 to read either one side of a document according to the instruction from an operator, the RADF 36 includes a carrying path for single-sided documents, a carrying path for double-sided documents, carrying path switching means, a sensor group for managing the conditions of documents passing through various sections, a control section, etc. There have been so many patent applications and off-the-shelf products of this RADF 36 so that detailed descriptions thereof are not provided here.

The scanner unit 40 constituting the scanner section 31 for reading the image of a document on the document supporter 35 is composed of: a lamp reflector assembly 41 for exposing the surface of the document; a first scanning unit 40a provided with a first reflecting mirror 42a for reflecting a reflected light image which comes from the document and heads for a charge-coupled device (CCD) 44; second scanning unit 40b provided with a second and third reflecting mirrors 42b and 42c for leading the reflected light image from the first reflecting mirror 42a to the CCD 44; an optical lens 43 for focusing the reflected light image on the CCD 44; and the CCD 44 for converting the reflected light image to an electric image signal.

The scanner section 31 is arranged in such a manner that, the RADF 36 and the scanner unit 40 cooperatively operate so that documents are sequentially supplied to the top surface of the document supporter 35 while the scanner unit 40 is caused to move along the bottom surface of the document supporter 35, and consequently images of the documents are read.

The first scanning unit 40a moves from left to right along the document supporter 35, at a constant speed of V. The second scanning unit 40b moves in parallel with and in the same direction as the first scanning unit 40a, at a speed of V/2.

With this arrangement, each line of the image of the document on the document supporter 35 sequentially focuses on the CCD 44 so that the image is read.

The image data obtained by reading the image of the document using the scanner unit 40 is supplied to an image processing section (discussed later). After being subjected to variety of processes, the image data is temporarily stored in a memory of the image processing section. The stored image data is accordingly read out from the memory upon receiving output instructions, and transferred to the laser recording section 32 in FIG. 7. Consequently, the image is formed on a sheet.

The laser recording section 32 includes: a sheet transfer system 50 which is a recording medium for forming an image; a laser writing unit 46 as an optical unit (writing unit); and an electrophotographic process section 47 for forming an image.

Figure 9:
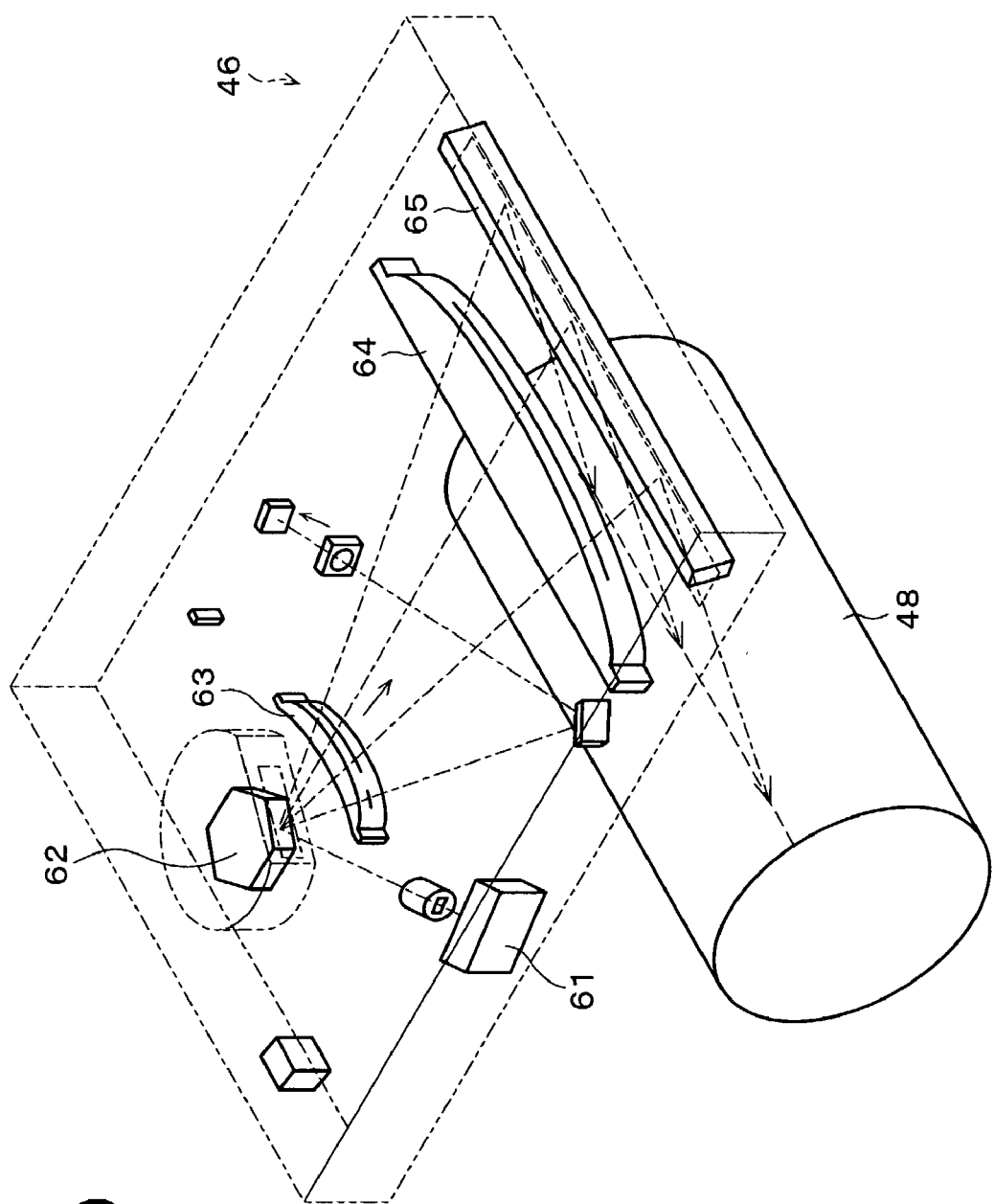
FIG. 9 is a schematic diagram of a laser writing unit of the image forming device illustrated in FIG. 7.

As FIG. 9 illustrates, the laser writing unit 46 includes members such as: a semiconductor laser 61 which outputs a laser light in accordance with either image data having been read by the foregoing scanner unit 40 and then supplied to the memory or image data supplied from an external device; a polygon mirror (rotating polygonal mirror) 62 for deflecting the laser light at a constant angular velocity; and f-θ lenses 63 and 64 and an output reflecting mirror 65, which are provided for adjusting the laser light to be deflected on a photosensitive drum 48 at a constant angular velocity, the photosensitive drum 48 constituting the electrophotographic process section 47 (cf. FIG. 7).

As in FIG. 7, the electrophotographic process section 47 is arranged in such a manner that, an electrostatic charge device 71, a developing device (developing unit) 72, a copying device 73, a separating device (not illustrated), a cleaning device 74, and a diselectrifying device (not illustrated) are provided around the photosensitive drum 48.

Figure 10:
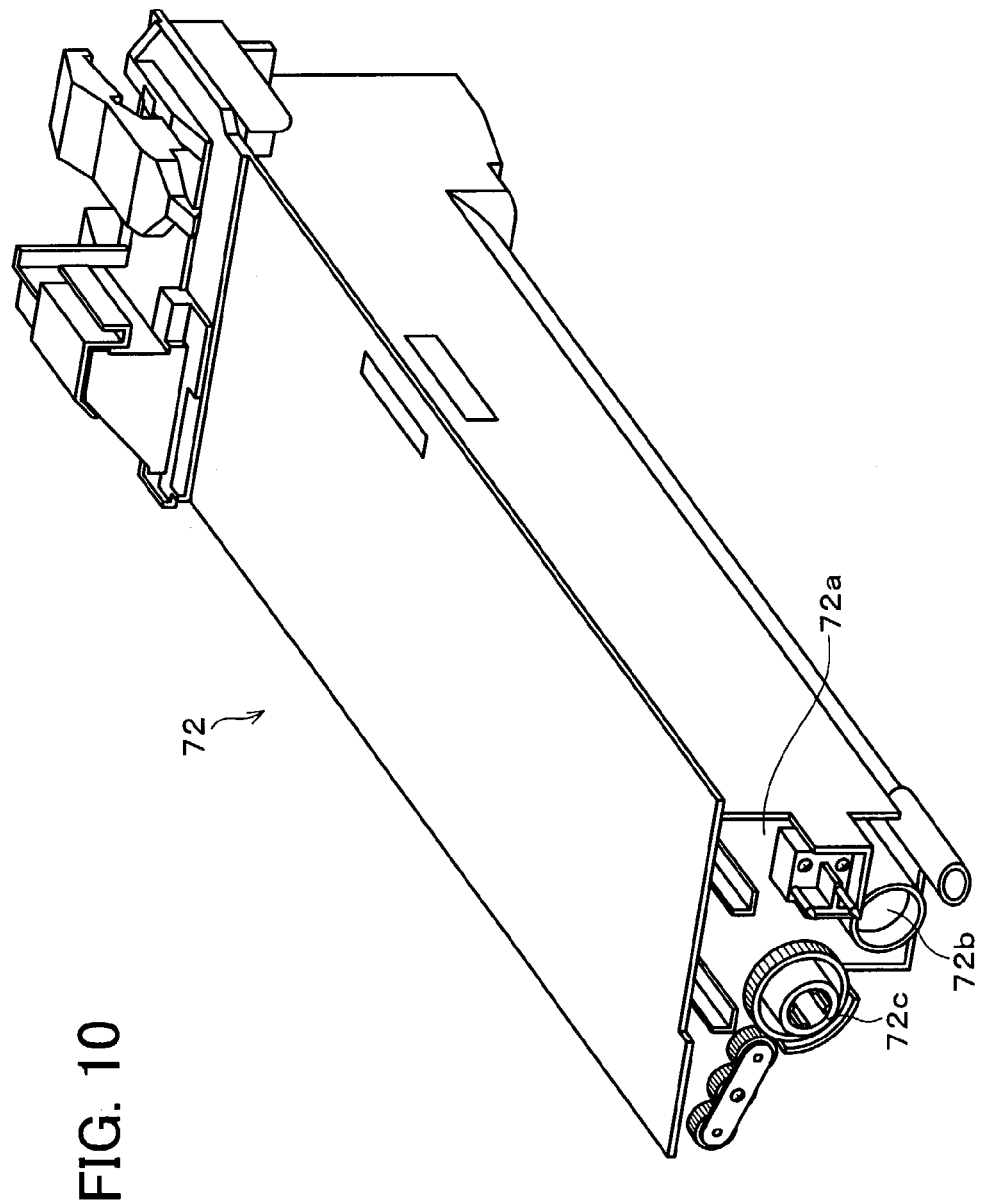
FIG. 10 is a schematic diagram of a developing device of the image forming device illustrated in FIG. 7.

The developing device 72 develops an electrostatic latent image on the surface of the photosensitive drum 48 by a developing agent, i.e. toner, so as to form a toner image. As illustrated in FIGS. 7 and 10, the developing device 72 is provided with a toner filling section 72a, a developing roller 72b, a stirring roller 72c, a doctor blade (not illustrated), a feeding roller (not illustrated), etc. The developing roller 72b feeds toner to an electrostatic latent image on the surface of the photosensitive drum 48, and the doctor blade regulates the thickness of a toner layer on the surface of the photosensitive drum 48. The feeding roller feeds the developing agent to the developing roller 72b, and the stirring roller 72c stirs the toner in the toner filling section 72a. The toner filling section 72a is filled with the developing agent, and this developing agent, i.e. the toner is stirred by the stirring roller 72c and thus electrically charged.

The sheet transfer system 50 is provided with: a transfer section 33 for transferring a sheet to a copying position where the copying device of the foregoing electrophotographic process section 47 is particularly provided; either sheet feeding cassette devices 51, 52, and 53 for feeding a sheet to the transfer section 33 or a manual paper feeding device 54 for appropriately feeding a sheet with a desired size; a fixing device 49 for fixing an image, a toner image in particular, formed on the sheet having been subjected to the copying; and a re-feeding path 55 for re-feeding the sheet in order to form an image on the backside of the sheet having been subjected to the fixing.

Downstream from the fixing device 49, a post-processing device 34 which receives a sheet with an image and then subjects the sheet to predetermined processing.

In the laser writing unit 46 and the electrophotographic process section 47, image data having been read from the image memory is formed on the surface of the photosensitive drum 48 as an electrostatic latent image, by scanning the image data using a laser light from the laser writing unit 46. The electrostatic latent image is visualized as a toner image by toner, and this toner image is electrostatically copied to the surface of a sheet fed from a paper feeding section (either the sheet feeding cassette devices 51, 52, and 53 or the manual paper feeding device 54) of a multistage paper feeding unit, and then fixed to the surface of the sheet.

In this manner, the sheet with the image is transferred to the inside of the post-processing device 34 via the fixing device 49 and a paper ejecting roller 56.

As in the foregoing descriptions, the molding material in accordance with the present embodiment excels in physical characteristics such as tensile elongation properties, flexural strength, rigidity ratio, fluidity, and flame retardance, and hence the molding material can be suitably used as a material for molding the foregoing optical unit, developing unit, and toner storage member.

Further, resin members of electrophotographic devices, such as the foregoing developing unit and toner storage unit where toner such as fly toner could touch or adhere to, are made of the aforementioned molding material or obtained molding product. With this arrangement, it is possible to obtain a molding product without the fusing of toner or deterioration caused by toner.

On this occasion, if, in particular, waste toner including a black colorant such as carbon black (black pigment) is adopted, it is possible to obtain a black-colored molding product without additionally adding a colorant to the molding material. Adopting this black-colored molding product to the above-mentioned devices with optical systems (more specifically, optical units for a electrophotographic device, such as a reading unit and writing unit, and a developing unit and toner storage member of an image forming device) allows to do away with a blacking process for preventing stray light and making the dirt of fly toner inconspicuous, and hence it is possible to obtain the devices which are low-cost as well as dirt-inconspicuous.

Figure 11:
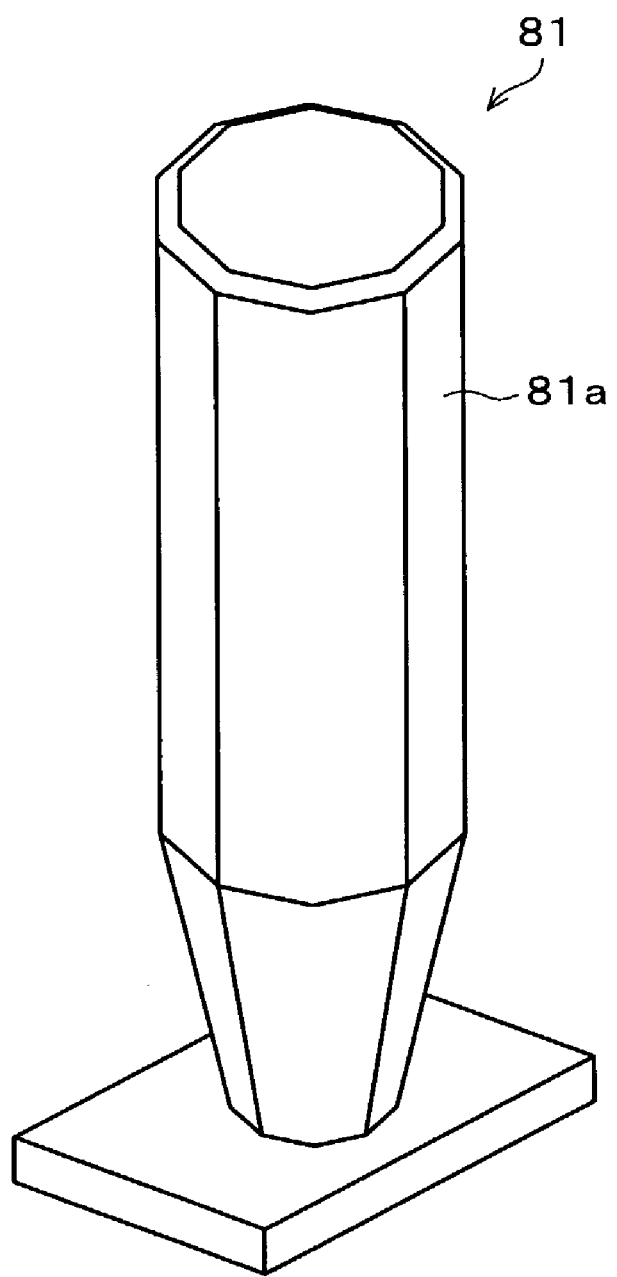
FIG. 11 is a schematic diagram of a toner cartridge for filling toner.

Although the cassette-type developing device 72 (toner cartridge) is exemplified in the foregoing descriptions as a toner storage member, the present embodiment is not limited to this arrangement. For instance, as FIG. 11 illustrates, when a main body 81a of a toner cartridge 81 for toner injection is composed of the molding material or the obtained molding product of the present embodiment, it is possible to obtain a toner cartridge, in which toner fusing and degradation caused by toner are eliminated, blacking process for preventing stray light and making the dirt of fly toner inconspicuous is unnecessary, and hence the dirt is inconspicuous.

Note that, even though the present embodiment has exemplified the optical units, developing unit of the developing device, and toner storage member as the molding products, it is needless to say possible to adopt the present invention to the production of molding products other than the above.

As described above, the molding material in accordance with the present invention includes the modified polyphenylene ether and waste toner. Also, the molding product of the present invention, e.g. optical units for an image forming device and a developing unit and a toner storage member of an electrophotographic device, is produced by molding the above-mentioned molding material. Further, the method of manufacturing the molding product of the present invention is arranged such that the modified polyphenylene ether and waste toner are continuously fed to the kneader at a constant rate while kneading these materials. Moreover, the method of recycling the waste toner in accordance with the present invention is arranged such that the waste toner and modified polyphenylene ether are fused and kneaded so that a molding material to be used is produced.

According to these arrangements, the waste toner which cannot be shipped as products is effectively recycled as a filler, and a molding product, which (i) excels in physical characteristics such as tensile strength, flexural rigidity, and flexural strength, (ii) is suitable for various uses, and (iii) is colored in advance, is obtained with ease and at low cost.

The above-mentioned molding material has high fluidity and excellent moldability. Further, since a colorant in the toner ingredient of the waste toner is included in the molding material, a coloring process is not necessary to obtain a colored molding product, e.g. the developing unit and toner storage member of the electrophotographic device. Thus, for instance, by molding the foregoing molding material including the waste toner, it is possible to obtain a developing unit and a toner storage member of an electrophotographic device, at low-cost and without toner fusing or deterioration. In particular, adopting the waste toner with a black colorant (e.g. carbon black) allows to obtain a molding material in which stray light is prevented and dirt due to fly toner is inconspicuous, without carrying out a blacking process.

Thus, waste toner which cannot be shipped as products can be effectively recycled as a filler, by molding the foregoing molding material so as to produce a developing unit and a toner storage member of an electrophotographic device.

In the present invention, the waste toner is preferably a toner ingredient containing styrene-acrylic resins, i.e. the waste toner is preferably styrene-acrylic-resins-containing waste toner. The styrene-acrylic-resins-containing waste toner excels in compatibility with modified polyphenylene ether, and this allows to obtain a molding product which retains physical properties of a molding product sorely made of modified polyphenylene ether, at low cost.

In the present invention, the ratio of the waste toner to the modified polyphenylene ether on a weight basis is preferably more than 5/95 and not more than 20/80.

With this arrangement, it is possible to obtain a molding product which has better tensile strength, flexural rigidity, flexural strength, tensile elongation properties, and flame retardance than a molding product sorely made of modified polyphenylene ether. The obtained molding product also meets V-1 standard of UL-94 vertical flammability testing.

The above-mentioned waste toner preferably includes a carrier for a developing agent of an electrophotography, in addition to the toner ingredient.

With this arrangement, it is possible to effectively uses a carrier ejected on the occasion of replacing a developing device, and hence recycle the carrier. Further, since the waste toner additionally includes the carrier, it is possible to increase the weight-per-unit of a resin molding product to be obtained, and hence the natural frequency of the resin molding product decreases and the anti-vibration property thereof is improved. Thus, this molding product has better anti-vibration property than a molding product sorely made of modified polyphenylene ether.

It is preferable that the molding material in accordance with the present invention further includes a flame retardant. As an amount of included waste toner with respect to modified polyphenylene ether increases, flame retardance of the obtained molding product tends to decrease. Thus, adding a flame retardant allows to obtain a molding product with good flame retardance, even if a relatively large amount of waste toner is included therein.

As described above, the waste toner preferably includes a black colorant, particularly a carbon black, and this arrangement allows to eliminate a coloring step from the manufacturing of a black-colored molding product. Thus, a black coloring process for preventing stray light is caused to be unnecessary, if devices with optical systems, more specifically optical units requiring light shielding, such as a writing unit and a reading unit, are formed using the above-mentioned molding material. Further, if members to which toner adheres, such as a developing unit and a toner storage member for an electrophotographic device, are made of the foregoing molding material, it is unnecessary to carry out a blacking process when obtaining a molding material in which stray light is prevented and dirt due to fly toner is caused to be inconspicuous.

It is therefore preferable that the optical unit (e.g. reading unit, writing unit) for the image forming device of the present invention includes a black colorant (e.g. carbon black) as a colorant constituting the toner ingredient. It is also preferable that the method of recycling the waste toner of the present invention is a method in which an optical unit for an image forming device is formed using the foregoing molding material, and waste toner including a black colorant (e.g. carbon black) is used for molding optical units (e.g. reading unit and writing unit) for the image forming device. This arrangement allows not only to effectively recycle waste toner, which cannot be shipped as products, as a filler but also to obtain an optical unit for an image forming device, which is cheap but without the fusing of toner or degradation caused by toner.

The method of manufacturing the molding product in accordance with the present invention is preferably arranged such that the modified polyphenylene ether and styrene-acrylic resins are individually measured using a measuring device and then kneaded together. Further, it is particularly preferable that the method of manufacturing the molding product of the present invention is arranged such that the modified polyphenylene ether and waste toner are continuously fed to the kneader at a constant rate, while kneading these materials.

With the foregoing method, waste toner which cannot be shipped as products can be effectively recycled as a filler, and a colored molding product, which excels in physical properties such as tensile strength, flexural rigidity, and flexural strength and is suitable for various uses, can be obtained with ease and at low cost. The foregoing method allows to always mix these materials at a constant rate so as to produce products with uniform quality. Further, the foregoing method also allows to mix (knead) the modified polyphenylene ether and waste toner more uniformly than the case of batch processing, and hence the degradation of tensile elongation properties of an obtained molding product is restrained.

The method of manufacturing the molding product in accordance with the present invention may be arranged in such a manner that, after fusing modified polyphenylene ether, the foregoing waste toner is added to the modified polyphenylene ether and then kneaded.

According to this method, waste toner which cannot be shipped as products can be effectively recycled as a filler, and a colored molding product, which excels in physical properties such as tensile strength, flexural rigidity, and flexural strength and is suitable for various uses, can be obtained with ease and at low cost. The foregoing method allows to always mix these materials at a constant rate so as to produce products with uniform quality. Further, the foregoing method also allows to mix (knead) the modified polyphenylene ether and waste toner more uniformly than the case of batch processing, and hence the degradation of tensile elongation properties of an obtained molding product is restrained.

The method of manufacturing the molding product of the present invention is preferably arranged in such a manner that the kneading is carried out using a biaxial continuous extrusion kneader.

A biaxial continuous extrusion kneader entangles only a few amount of air and hence this kneader can constantly knead and extrude materials. Further, adopting a biaxial continuous extrusion fusing kneader further ensures uniform dispersion of waste toner in modified polyphenylene ether so that these materials are kneaded further uniformly.

The invention being thus described, it will be obvious that the same way may be varied in many ways. Such variations are not to be regarded as a departure from the spirit and scope of the invention.

Now, the followings will describe further details of the present invention, with reference to the following examples. It is noted that the present invention is not at all limited by them. In the examples, tensile strength, tensile elongation properties, flexural strength, flexural rigidity ratio (modulus of elasticity in flexure), Izod impact strength, flame retardance, fluidity, and natural frequency were measured by the following methods.

(Tensile Strength, Tensile Elongation Properties, Flexural Strength, Flexural Rigidity Ratio, and Izod Impact Strength)

All of these physical properties were measured in accordance with JIS K 6911.

(Flame Retardance)

Flame retardance was measured in accordance with vertical flammability testing standards of UL94 V-0, V-1, and V-2. More specifically, first, 5 test pieces of a molding product, each of them being 12.7 cm (5 inches)×1.27 cm (½ inch) in size and about 3.1 mm (⅛ inch) thick, were left in the air of 23° C.±2° C. and 50%±5%RH for 48 hours. Then a flame of a gas burner was brought close to each of the test pieces, and a burning time of each test piece after 10 seconds exposure to the flame, i.e. a time from the start of exposure to the flame to the extinction of the flame (hereinafter, this time will be referred to as flame exposure time) was measured. This measurement was carried out twice for each test piece, i.e. 10 times in total. Also, a sum total of all burning times of the test pieces (hereinafter, this sum total will be referred to as total burning time) was calculated. Further, a piece of cotton was provided below the test piece, and how many times an object falling from the test piece ignited the piece of cotton (this number of times will be referred to as cotton ignition frequency) was counted. On the basis of these measurements, it was determined that which one of the standards of UL94 V-0, V-1, and V-2 is met.

Table. 2 illustrates the criteria for the vertical flammability testing standards of UL94 V-0, V-1, and V-2.

TABLE 2

| GRADES | UL94 V-0 | UL94 V-1 | UL94 V-2 |
|---|---|---|---|
| FIRST FLAME EXPOSURE TIME | NOT MORE THAN 10 SECONDS | NOT MORE THAN 30 SECONDS | NOT MORE THAN 30 SECONDS |
| SECOND FLAME EXPOSURE TIME | NOT MORE THAN 30 SECONDS | NOT MORE THAN 60 SECONDS | NOT MORE THAN 60 SECONDS |
| TOTAL BURNING TIME | NOT MORE THAN 50 SECONDS | NOT MORE THAN 250 SECONDS | NOT MORE THAN 250 SECONDS |
| COTTON IGNITION FREQUENCY | 0 | 0 | 1 OR MORE |

(Fluidity)

Fluidity was measured based on JIS K 7210, at a measuring temperature of 200° C. and a load of 2.16 kg. "Melt Indexer S-01" made by Toyo Seiki Seisaku-sho, Ltd. was adopted as a measuring device.

(Natural Frequency)

Figure 12:
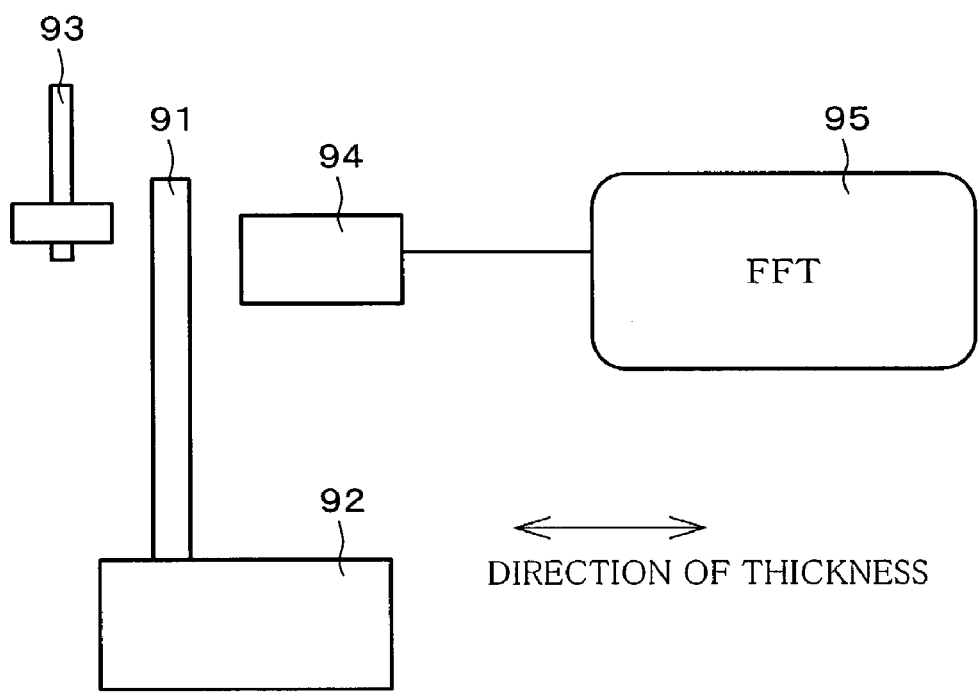
FIG. 12 describes a method of measuring a natural frequency.

As illustrated in FIG. 12, a molding product which is 10 mm wide, 100 mm long, and 4 mm thick was adopted as a sample 91, and a part 50 mm from the bottom end of the sample 91 was fixed by pinching. Then a part 20 mm from the top end of the sample 91 was hammered only once by a plastic hammer 93, and the vibration on this occasion was measured using an optical non-contact displacement gauge 94. The output from this non-contact displacement gauge 94 was subjected to frequency analysis by fast Fourier transformation (FFT) using a spectrum analyzer 95, so that the natural frequency was measured.

EXAMPLE 1

Modified polyphenylene ether and waste toner material (styrene-acrylic-resins-containing waste toner) as waste toner were individually measured using a measuring feeder in FIG. 5(a), then the modified polyphenylene ether and waste toner material were continuously fed to the hopper 3 of the foregoing kneader/extruder illustrated in FIGS. 5(a)-5(c), at a ratio of 90:10 (modified polyphenylene ether:waste toner material). Subsequently, the modified polyphenylene ether and waste toner material were fused and kneaded in the kneader/extruder, and consequently a molding product (1) was obtained.

What was adopted as the waste toner material was fine particles (toner material) of 1 μm-5 μm in diameter, produced on the occasion of classifying toner of 8 μm in average diameter, including 100 weight units of binder resin, 1.5 weight units of offset preventing agent, 6 weight units of colorant, and 2.5 weight units of charge control agent. As the binder resin, styrene acrylate copolymer (trade name: "SPR6900") made by Sanyo Chemical Industries, Ltd. was adopted. As the offset preventing agent, polypropylene (trade name: "Biscol 550P") made by Sanyo Chemical Industries, Ltd. was adopted. As the colorant, carbon (trade name: "MA-100S") made by Mitsubishi Chemical Corp. was adopted. As the charge control agent, quaternary ammonium salt (trade name: "P51") made by Orient Chemical Industries, Ltd. was adopted.

As the modified polyphenylene ether, modified polyphenylene ether (trade name: "Xyron", grade 100V) made by Asahi Kasei Corp. was adopted.

The conditions of material feeding and kneading in the Examples 1-8 are illustrated in Table. 1.

According to the foregoing methods, tensile strength, tensile elongation properties, flexural strength, flexural rigidity ratio, and Izod impact strength of the obtained resin molding product (1) were measured.

Figure 3:
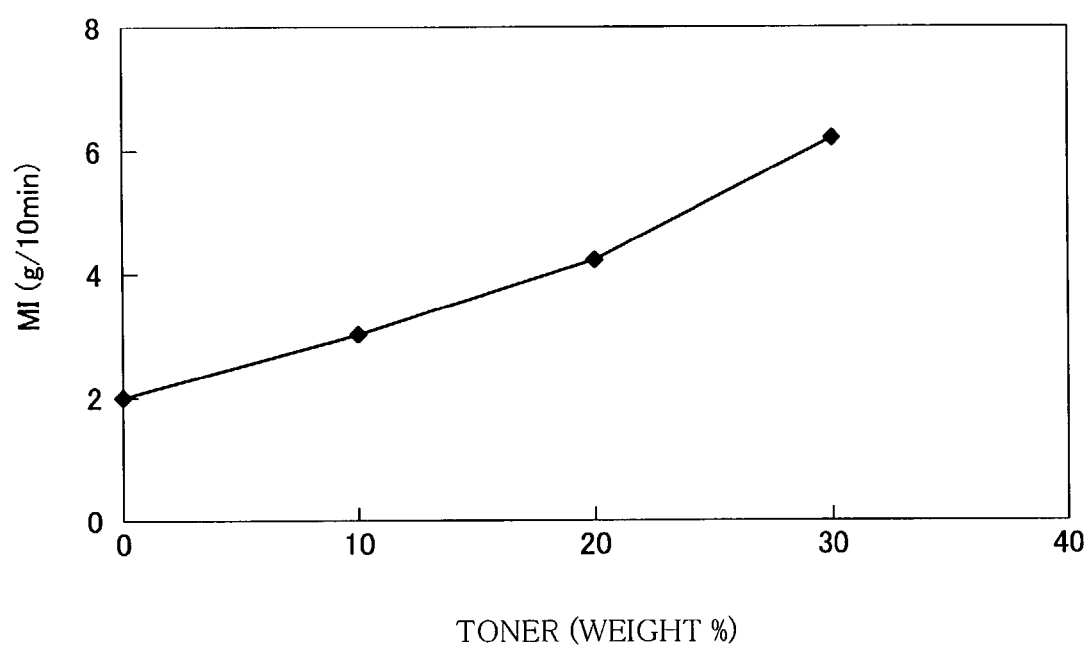
FIG. 3 illustrates a chart indicating the relationship between (i) an amount of a toner material as waste toner included in a molding material made of modified polyphenylene ether and the toner material and (ii) the fluidity of an obtained molding product.

Meanwhile, by the operations identical with the above except the addition of waste toner, a resin molding product (X), which is sorely made of modified polyphenylene ether, i.e. to which waste toner is not added, was obtained as a virgin material (reference material). Tensile strength, tensile elongation properties, flexural strength, flexural rigidity ratio, and Izod impact strength of the resin molding product (X) made of the above-described modified polyphenylene ether were measured in accordance with the foregoing methods, and the physical properties of the resin molding product (1) were identified as in FIG. 1(a), assuming that the physical properties of the resin molding product (X) are 100%. Further, flame retardance and fluidity of the obtained resin molding product (1) were measured in accordance with the foregoing methods, as illustrated in FIGS. 2 and 3 and Table. 3. Incidentally, the phrases in parentheses in the figures indicate units.

EXAMPLE 2

A resin molding product (2) was obtained by the operations identical with those in Example 1, except that the mixture ratio of the modified polyphenylene ether to the waste toner material was changed from 90:10 to 80:20 (modified polyphenylene ether:waste toner material) on a weight basis.

Tensile strength, tensile elongation properties, flexural strength, flexural rigidity ratio, and Izod impact strength of the resin molding product (2) were measured in accordance with the foregoing methods. The physical properties of the resin molding product (2) were identified as in FIG. 1(b), assuming that the physical properties of the resin molding product (X) are 100%. Further, flame retardance and fluidity of the obtained resin molding product (2) were measured in accordance with the foregoing methods, as illustrated in FIGS. 2 and 3 and Table. 3.

EXAMPLE 3

A resin molding product (3) was obtained by the operations identical with those in Example 1, except that (i) the mixture ratio of the modified polyphenylene ether to the waste toner material was changed from 90:10 to 70:30 (modified polyphenylene ether:waste toner material) on a weight basis, and (ii) the conditions of material feeding and kneading were arranged as in Table. 1.

Tensile strength, tensile elongation properties, flexural strength, flexural rigidity ratio, and Izod impact strength of the resin molding product (3) were measured in accordance with the foregoing methods. The physical properties of the resin molding product (3) were identified as in FIG. 1(c), assuming that the physical properties of the resin molding product (X) are 100%. Further, flame retardance and fluidity of the obtained resin molding product (3) were measured in accordance with the foregoing methods, as illustrated in FIGS. 2 and 3 and Table. 3.

TABLE 3

| | EXAMPLE 1 | EXAMPLE 2 | EXAMPLE 3 |
|---|---|---|---|
| AMOUNT OF INCLUDED WASTE TONER MATERIAL | 10 weight % | 20 weight % | 30 weight % |
| FLAME EXPOSURE TIME | ≦22 seconds | ≦29 seconds | ≦43 seconds |
| TOTAL BURNING TIME | 76 seconds | 118 seconds | 195 seconds |
| COUPON IGNITION FREQUENCY | 0 | 0 | 0 |
| FLAME RETARDANT GRADE | V1 | V1 | — |

EXAMPLE 4

A resin molding product (4) was obtained by the operations identical with those in Example 1, except that (i) a resin compound (molding material), obtained by mixing modified polyphenylene ether and waste toner material (waste toner) at the ratio identical with that of Example 1, was added all at once to the kneader/extruder identical with that of Example 1 by batch processing and (ii) the conditions of material feeding and kneading were arranged as in Table. 1.

Figure 4:
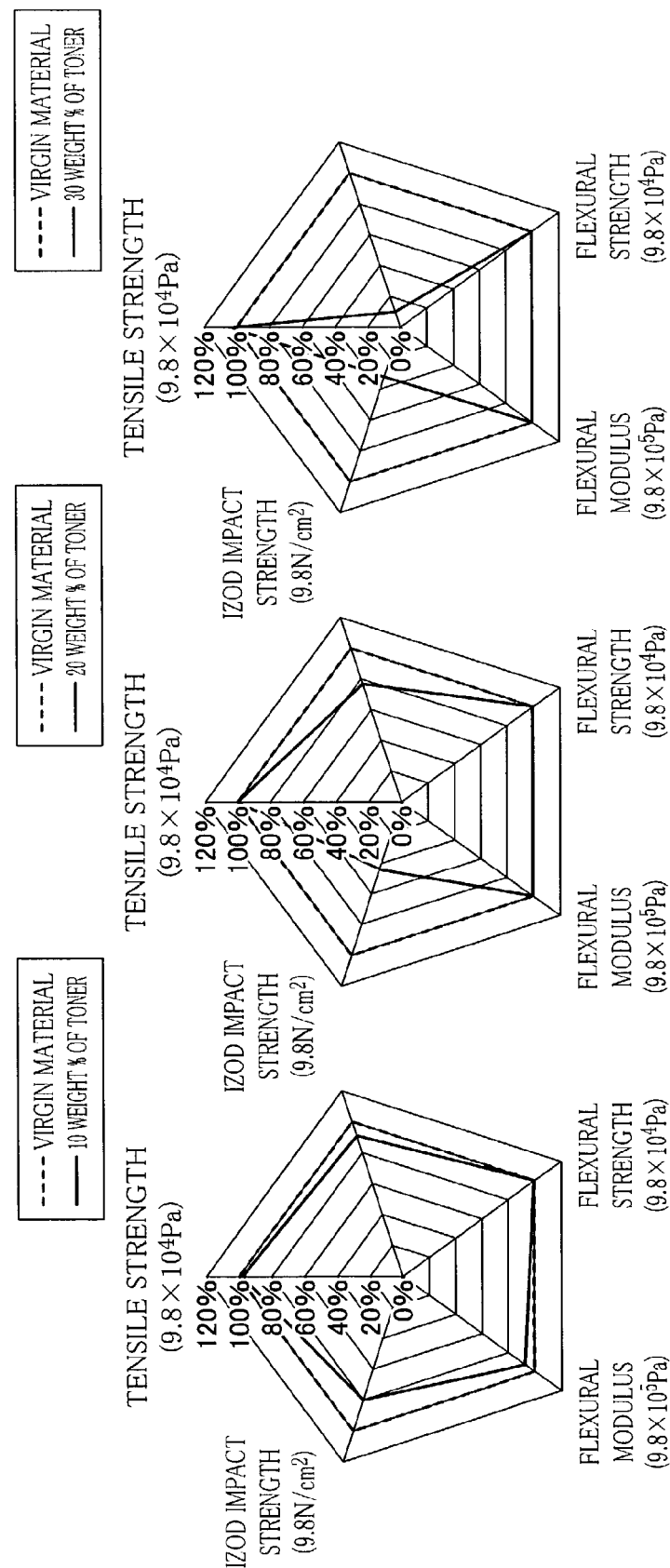
FIGS. 4(a)–4(c) illustrate respective charts indicating the relationship between (i) an amount of a toner material as waste toner included in a molding material made of modified polyphenylene ether and the toner material and (ii) the physical characteristics of a molding product obtained through batch processing.

Tensile strength, tensile elongation properties, flexural strength, flexural rigidity ratio, and Izod impact strength of the resin molding product (4) were measured in accordance with the foregoing methods. The physical properties of the resin molding product (4) were identified as in FIG. 4(a), assuming that the physical properties of the resin molding product (X) are 100%.

EXAMPLE 5

A resin molding product (5) was obtained by the operations identical with those in Example 2, except that (i) a resin compound (molding material), obtained by mixing modified polyphenylene ether and waste toner material (waste toner) at the ratio identical with that of Example 2, was added all at once to the kneader/extruder identical with that of Example 2 by batch processing, and (ii) the conditions of material feeding and kneading were arranged as in Table. 1.

Tensile strength, tensile elongation properties, flexural strength, flexural rigidity ratio, and Izod impact strength of the resin molding product (5) were measured in accordance with the foregoing methods. The physical properties of the resin molding product (5) were identified as in FIG. 4(b), assuming that the physical properties of the resin molding product (X) are 100%.

EXAMPLE 6

A resin molding product (6) was obtained by the operations identical with those in Example 3, except that (i) a resin compound (molding material), obtained by mixing modified polyphenylene ether and waste toner material (waste toner) at the ratio identical with that of Example 3, was added all at once to the kneader/extruder identical with that of Example 3 by batch processing.

Tensile strength, tensile elongation properties, flexural strength, flexural rigidity ratio, and Izod impact strength of the resin molding product (6) were measured in accordance with the foregoing methods. The physical properties of the resin molding product (6) were identified as in FIG. 4(c), assuming that the physical properties of the resin molding product (X) are 100%.

As the results illustrated in FIGS. 1(a)-1(c) and 4(a)-4(c) indicate, the resin molding product made of the molding material in accordance with the present invention has physical properties such as tensile strength, flexural strength and flexural rigidity equivalent to those of the resin molding product sorely made of modified polyphenylene ether. Further, since the ratio of the modified polyphenylene ether to the waste toner on a weight basis is not less than 5/95 and not more than 20/80, the degradation of physical properties such as flame retardance and tensile elongation properties can be restrained. Moreover, when the modified polyphenylene ether and waste toner are individually measured and added (using the foregoing volumetric and gravimetric feeders), the physical properties of the obtained molding product are better on the whole than the physical properties in the case of adding these materials all at once by batch processing.

EXAMPLE 7

To recycle a carrier recovered on the occasion of replacing a developing agent of an electrophotographic device every time a predetermined number of sheets are printed, ferrite which is 60 μm in average diameter as a carrier and the waste toner material and modified polyphenylene ether identical with those of Example 1 were used, and these modified polyphenylene ether, waste toner material, and carrier were continuously fed to the hopper 3 of the kneader/extruder of Example 1, at a ratio of 45:5:50 (on a weight basis) and kneaded, in the conditions of material feeding and kneading as described in Example 1. As a result, a resin molding product (7) was obtained.

Natural frequency of this resin molding product (7) was measured according to the foregoing method, and also natural frequency of the resin molding product (1) was similarly measured. Table. 4 shows the natural frequency (normalized natural frequency) of the resin molding product (7) on condition that the natural frequency of the resin molding product (1) is assumed as 1 (reference), in addition to the compositions (weight %) of the measured molding materials (resin compounds).

TABLE 4

| | | EXAMPLE 1 | EXAMPLE 7 |
|---|---|---|---|
| RATIOS ON WEIGHT BASIS | MODIFIED POLYPHENYLENE ETHER | 90 weight % | 45 weight % |
| | WASTE TONER MATERIAL | 10 weight % | 5 weight % |
| | CARRIER | — | 50 weight % |
| NORMALIZED NATURAL FREQUENCY | | 1 | 0.8 |

As illustrated in Table. 4, the natural frequency of the resin molding product (7) formed by molding a molding material including a carrier was around 0.8 times as much as the natural frequency of the resin molding material (1) of Example 1 made of a molding material not including a carrier.

According to this result, it is proved that since the molding material includes the waste toner material, modified polyphenylene ether, and carrier, the natural frequency of the obtained molding product decreases so that the anti-vibration property thereof is improved.

EXAMPLE 8

The materials constituted as in Table. 5 were continuously fed to the hopper 3 of the kneader/extruder of Example 3 and kneaded, in the conditions of material feeding and kneading in Table. 1. As a result, resin molding products (8) and (9) were obtained. As the modified polyphenylene ether, modified polyphenylene ether (trade name: "Xyron", grade 100V) made by Asahi Kasei Corp. was adopted. As the waste toner, a waste toner material (styrene-acrylic-resins-containing waste toner) described in Example 1 was adopted. As the flame retardant, phosphate ester (trade name: "CR733S") made by Daihachi Chemical Industry Co., Ltd. was adopted.

TABLE 5

|  | RESIN MOLDING PRODUCT (8) | RESIN MOLDING PRODUCT (9) |
| --- | --- | --- |
| MODIFIED POLYPHENYLENE ETHER | 60 WEIGHT UNITS | 70 WEIGHT UNITS |
| STYRENE-ACRYLIC-RESINS-CONTAINING WASTE TONER | 30 WEIGHT UNITS | 30 WEIGHT UNITS |
| FLAME RETARDANT | 10 WEIGHT UNITS | — |
| GRADE OF FLAME RETARDANT | V2 | BELOW STANDARD |

According to this arrangement, it was proved that since the molding material additionally contains the flame retardant, the molding product with good flame retardance is obtained even if the molding product contains relatively large amount of waste toner.

EXAMPLE 9

A developing agent for a photocopier (trade name: "DM-2000") made by Sharp Kabushiki Kaisha was charged in a test developer tank produced by injection molding in the conditions of Example 1. After being aged for 100 hours at a temperature of 45° C. and humidity of 90%, the condition of the test developer tank was observed. As a result, it was confirmed that neither toner fusing to the tank nor degradation of the tank occurred so that the condition was satisfactory. This proves that a component for an electrophotographic device, in which no toner fusing and degradation due to toner are observed, is obtained by forming the component using the molding material of Example 1, i.e. by adopting the molding product of Example 1 as the component.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A molding material, comprising: toner, which is defective toner, substandard toner spun off during a toner manufacturing step, toner ingredient resin, unused residual waste toner, and/or recovered residual toner, which is waste; and modified polyphenylene ether compatible with the toner, which is an engineering plastic obtained by alloying the polyphenylene ether with general-purpose polystyrene, high-impact polystyrene resin,acryloniltrilec-butadiene-styrene copolymer, and/or polyamide; wherein an amount of the toner with respect to the modified polyphenylene ether is represented in such a manner that a weight of a toner ingredient in the toner to the modified polyphenylene is not less than 5/95 and not more than 20/80.

2. The molding material as defined in claim 1, wherein, the toner includes a toner ingredient including styrene-acrylic resins.

3. The molding material as defined in claim 1, wherein, the toner includes a carrier for a developing agent electrophotography, in addition to a toner ingredient.

4. The molding material as defined in claim 1, further comprising a flame retardant.

5. The molding material as defined in claim 1, wherein, the toner includes a black colorant as a colorant constituting a toner ingredient.

6. The molding material as defined in claim 1, wherein the amount of toner with respect to the modified polyphenylene is added to the modified polyphenylene ether is not less than 10/90 and not more than 20/80.

7. The molding material as defined in claim 1, wherein the modified polyphenylene ether is a particle With a particle size substantially equal to a particle size of the toner.

8. The molding material as defined in claim 1, wherein pellets of the modified polyphenylene ether are fused and solidified, or crushed, into particles with a particle size substantially equal to a particle size of the toner, and the modified polyphenylene ether is mixed with the toner all at once.

* * * * *